United States Patent
Niikura et al.

(10) Patent No.: US 6,845,618 B2
(45) Date of Patent: Jan. 25, 2005

(54) RANKINE CYCLE DEVICE OF INTERNAL COMBUSTION ENGINE

(75) Inventors: Hiroyuki Niikura, Wako (JP); Hiroyoshi Taniguchi, Wako (JP); Makoto Uda, Wako (JP); Kiyoshi Katahira, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/398,805

(22) PCT Filed: Oct. 5, 2001

(86) PCT No.: PCT/JP01/08824

§ 371 (c)(1), (2), (4) Date: Oct. 6, 2003

(87) PCT Pub. No.: WO02/31319

PCT Pub. Date: Apr. 18, 2002

(65) Prior Publication Data

US 2004/0050052 A1 Mar. 18, 2004

(30) Foreign Application Priority Data

Oct. 10, 2000 (JP) .................................... 2000-314434

(51) Int. Cl.⁷ ..................... F01K 1/00; F01K 23/02; F01K 23/10; F01N 5/02; F02G 5/02
(52) U.S. Cl. ..................... 60/618; 60/653; 60/670
(58) Field of Search ..................... 60/618, 651, 653, 60/670, 671

(56) References Cited

U.S. PATENT DOCUMENTS 4,586,338 A    5/1986  Barrett et al. ................. 60/618
5,896,746 A *  4/1999  Platell ........................... 60/618
6,732,525 B2 * 5/2004  Endoh et al. ................. 60/618
6,751,959 B1 * 6/2004  McClanahan et al. ....... 60/670
2004/0025501 A1 * 2/2004 Endoh et al. ................. 60/320

FOREIGN PATENT DOCUMENTS

JP    57-26363 A    2/1982
JP    8-144850 A    6/1996

* cited by examiner

Primary Examiner—Sheldon J Richter
(74) Attorney, Agent, or Firm—Birch, Stewart, Kolasch & Birch, LLP

(57) ABSTRACT

In a Rankine cycle system for an internal combustion engine, including an evaporator (3) for generating a vapor, an expander (4) for converting a heat energy of the vapor into a mechanical energy, a condenser (5) for cooling the vapor discharged from the expander (4) to restore it into water, a tank (6) for storage of the water from the condenser (5), and supply pumps (7, 8) for supplying the water in said tank (6) to the evaporator (3) in a pressurizing manner, the water in the tank (6) is supplied via a water jacket (105) of the internal combustion engine (1) to a dispensing valve (106) by the lower-pressure pump (7). A portion of the water dispensed by the dispensing valve (106) is further pressurized and supplied to the evaporator (3) by the higher-pressure pump (8), and another portion of the water dispensed by the dispensing valve (106) is discharged to the tank (6) after dissipating its heat in an auxiliary (110) such as a heater for heating a vehicle compartment and the like. Thus, it is possible to sufficiently cool heated portions of the internal combustion engine (1) by the water which is a liquid-phase working medium, while maintaining the performance of the Rankine cycle system, thereby aiming at the disuse of a radiator.

6 Claims, 14 Drawing Sheets

RANKINE CYCLE DEVICE OF INTERNAL COMBUSTION ENGINE

This application is the national phase under 35 U.S.C. § 371 of PCT International Application No. PCT/JP01/08824 which has an International filing date of Oct. 5, 2001, which designated the United States of America.

FIELD OF THE INVENTION

The present invention relates to a Rankine cycle system utilizing a waste heat from an internal combustion engine, and particularly, to a Rankine cycle system designed so that heated portions of an internal combustion engine can be cooled by a working medium.

BACKGROUND ART

A Rankine cycle system is described in Japanese Utility Model Application Laid-open No.59-174308, which includes an evaporator for heating a liquid-phase working medium by an exhaust gas from an internal combustion engine to generate a gas-phase working medium, an expander driven by the gas-phase working medium generated in the evaporator, a condenser for cooling the gas-phase working medium passed through the expander to restore it into the liquid-phase working medium, and a supply pump for supplying the liquid-phase working medium from the condenser in a pressurizing manner to the evaporator.

In the above-described conventional Rankine cycle system, the water as the liquid-phase working medium is passed not only through the inside of the evaporator mounted in an exhaust pipe from the internal combustion engine, but also through the inside of a cooling passage defined in a cylinder head and a cylinder block to heat them, whereby a waste heat from the internal combustion engine is utilized further effectively, and the cylinder head and the cylinder block are cooled by the liquid-phase working medium, thereby aiming at the disuse of a conventional radiator.

In general, however, the ratio of the flow rate of the water as the liquid-phase working medium in the Rankine cycle system to the flow rate of the cooling water for the internal combustion engine is on the order of 1:100, and thus, the flow rate of the cooling water for the internal combustion engine is far large, as compared with the flow rate of the water in the Rankine cycle system. The pressure of the water supplied to the evaporator in the Rankine cycle system is about 100 times the pressure of the cooling water supplied to the water jacket of the internal combustion engine, resulting in a large difference existing between both of the pressures.

Therefore, it is virtually difficult, because of a large difference in flow rate and pressure between the water-circulating paths, to connect a water-circulating path in the Rankine cycle system and a water-circulating path for the internal combustion engine in line to each other to aim at the disuse of a radiator, and there is a possibility that the internal combustion engine might be overheated and that the Rankine cycle system could not exhibit a sufficient performance.

DISCLOSURE OF THE INVENTION

The present invention has been accomplished with the above circumstances in view, and it is an object of the present invention to ensure that the heated portions of the internal combustion engine can be cooled sufficiently by the liquid-phase working medium, while maintaining the performance of the Rankine cycle system, thereby aiming at the disuse of a radiator.

To achieve the above object, according to a first aspect and feature of the present invention, there is proposed a Rankine cycle system for an internal combustion engine, including an evaporator for heating a liquid-phase working medium by a waste heat from an internal combustion engine to generate a gas-phase working medium, an expander for converting a heat energy of the gas-phase working medium discharged from the evaporator into a mechanical energy, a condenser for cooling the gas-phase working medium discharged from the expander to restore the gas-phase working medium into the liquid-phase working medium, a tank for storage of the liquid-phase working medium discharged from the condenser, and pumps for supplying the liquid-phase working medium in the tank to the evaporator, characterized in that the pumps are a lower-pressure pump and a higher-pressure pump, the lower-pressure pump having the liquid-phase working medium in the tank pass through a cooling means for the internal combustion engine, thereby heating and supplying the liquid-phase working medium to a dispensing valve, a portion of the liquid-phase working medium dispensed by the dispensing valve being pressurized by the higher-pressure pump and supplied to the evaporator, another portion of the liquid-phase working medium dispensed by the dispensing valve being discharged to the tank after dissipating its heat in an auxiliary.

With the above arrangement, the liquid-phase working medium in the tank is supplied to the cooling means for the internal combustion engine by the lower pressure pump to cool heated portions of the internal combustion engine, and thereafter, a portion of the liquid-phase working medium exiting from the cooling means is supplied from the dispensing valve to the higher-pressure pump and supplied in a pressurized state to the evaporator in the Rankine cycle system, while another portion of the liquid-phase working medium exiting from the cooling means is supplied from the dispensing valve to the auxiliary, and the liquid-phase working medium exiting from the expander in the Rankine cycle system and liquefied through the condenser and the liquid-phase working medium dissipating its heat in the auxiliary are returned to the tank. Therefore, it is possible to supply the liquid-phase working mediums having flow rates and pressures suitable respectively for the Rankine cycle system and the cooling means, while uniting a liquid-phase working medium-circulating line in the Rankine cycle system and a liquid-phase working medium-circulating line in the cooling means for the internal combustion engine. Thus, it is possible to cool the heated portions of the internal combustion engine sufficiently, while maintaining the performance of the Rankine cycle system, thereby aiming at the disused of a radiator.

According to a second aspect and feature of the present invention, in addition to the first feature, the liquid-phase working medium exiting from the lower-pressure pump is preheated in a heat exchanger mounted in an exhaust pipe in the internal combustion engine and supplied to the cooling means.

With the above arrangement, the liquid-phase working medium supplied from the lower-pressure pump to the cooling means is preheated in the exchanger mounted in the exhaust pipe and hence, it is possible not only to utilize a waste heat of an exhaust gas further effectively, but also to prevent the occurrence of the overcooling by the liquid-phase working medium passed through the cooling means when the internal combustion engine is at a lower temperature, thereby promoting the warming of the internal combustion engine.

According to a third aspect and feature of the present invention, in addition to the first or second feature, a portion of the heated liquid-phase working medium dispensed from the dispensing valve is used as a lubricating medium for the expander.

With the above arrangement, a portion of the heated liquid-phase working medium dispensed from the dispensing valve is used as a lubricating medium for the expander and hence, it is possible to prevent the dropping of the temperature of the expander due to the lubricating medium having a lower temperature to suppress the reduction of the expanding work, thereby enhancing the efficiency of recovery of the waste heat from the internal combustion engine.

According to a fourth aspect and feature of the present invention, in addition to the third feature, the portion of the liquid-phase working medium supplied as the lubricating medium is supplied in the form of a gas-phase working medium to an expansion stroke of the expander.

With the above arrangement, the portion of the liquid-phase working medium supplied as the lubricating medium is supplied in the form of the gas-phase working medium to the expansion stroke of the expander and hence, the heat energy own by the liquid-phase working medium serving as the lubricating medium can be utilized effectively to increase the output from the expander.

According to a fifth aspect and feature of the present invention, in addition to the second feature, a portion of the heated liquid-phase working medium dispensed from the dispensing valve is passed through a reducing valve to be converted into a gas-phase working medium, which is supplied to an expansion stroke of the expander.

With the above arrangement, the portion of the heated liquid-phase working medium dispensed from the dispensing valve is converted into the gas-phase working medium by the reducing valve, which is supplied to the expansion stroke of the expander, and hence, a heat energy received from the heated portions of the internal combustion engine by the liquid-phase working medium can be utilized effectively to increase the output from the expander.

According to a sixth aspect and feature of the present invention, in addition to any of the first to fifth features, water is used as the liquid-phase working medium.

With the above arrangement, the water, having a wide range of temperature in which it can be used without variation in composition such as carbonization and the like, is used as the liquid-phase working medium. Therefore, the gas-phase working medium in a higher-temperature state supplied to the expander and the liquid-phase working medium in a lower-temperature state discharged from the cooling medium for the internal combustion engine can be merged into each other without hindrance and moreover, when water is used as the lubricating medium, the working medium and the lubricating medium can be mixed with each other without hindrance.

Water in an embodiment corresponds to the liquid-phase working medium of the present invention; a vapor in the embodiment corresponds to the gas-phase working medium of the present invention; and a water jacket 105 in the embodiment corresponds to the cooling means of the present invention.

BRIEF DESCRIPTION OF THE DRAWINGS

FIG. 1 is a schematic illustration of a Rankine cycle system for an internal combustion engine;

FIG. 2 is a vertical sectional view of an expander, corresponding to a sectional view taken along a line 2—2 in FIG. 4;

FIG. 3 is an enlarged sectional view of an area around a rotational axis in FIG. 2;

FIG. 4 is a sectional view taken along a line 4—4 in FIG. 2;

FIG. 5 is a sectional view taken along a line 5—5 in FIG. 2;

FIG. 6 is an enlarged view of a portion of FIG. 4;

FIG. 7 is an enlarged sectional view taken along a line 7—7 in FIG. 3;

FIG. 8 is a diagram showing sectional shapes of a rotor chamber and a rotor;

FIG. 9 is an exploded perspective view of the rotor;

FIG. 10 is an exploded perspective view of a rotor segment;

FIG. 11 is an exploded perspective view of a vane;

FIG. 12 is an exploded perspective view of a rotary valve;

FIG. 13 is a graph showing the relationship between amounts of increment in output from the expander at temperatures of lubricating water with respect to the phase in which the lubricating water is supplied to an expansion stroke of the expander; and FIG. 14 is a graph showing the relationship between amounts of increment in output from the expander in amounts of lubricating water supplied with respect to the phase in which the lubricating water is supplied to an expansion stroke of the expander.

BEST MODE FOR CARRYING OUT THE INVENTION

Figure 1:
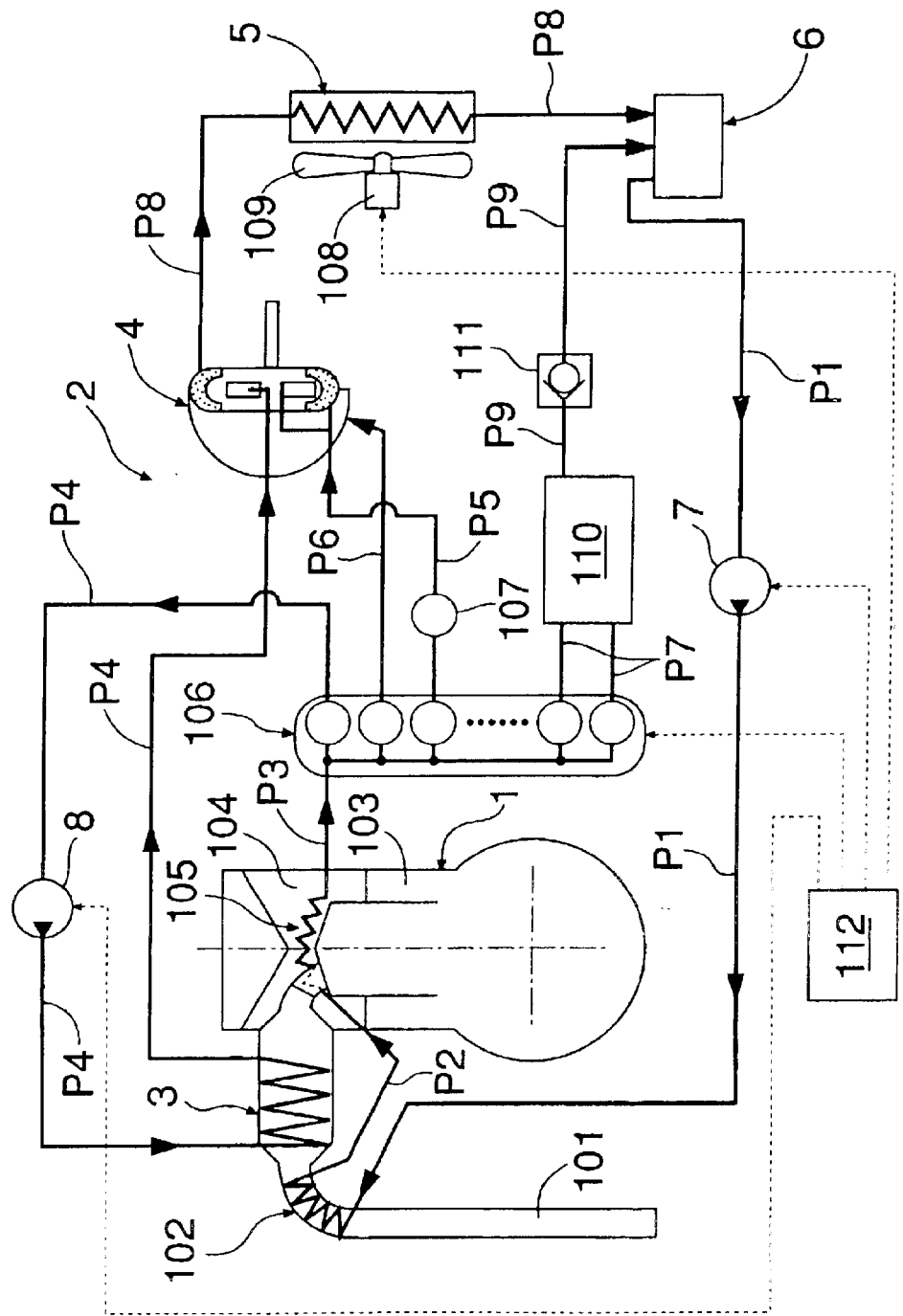
FIGS. 1 to 14 show an embodiment of the present invention.

As shown in FIG. 1, a Rankine cycle system 2 for recovering a heat energy of an exhaust gas from an internal combustion engine 1 to output a mechanical energy includes an evaporator 3 for generating a high-temperature and high-pressure vapor by heating water using the exhaust gas from the internal combustion engine 1 as a heat source, an expander 4 for outputing a shaft torque by the expansion of the high-temperature and high-pressure vapor, a condenser 5 for cooling a dropped-temperature and dropped-pressure vapor discharged from the expander 4 to liquefy it, a tank 6 for storage of the water discharged from the condenser 5, and a lower-pressure pump 7 and a higher-pressure pump 8 for supplying the water in the tank 6 again to the evaporator 3.

The water in the tank 6 is pressurized to 2 to 3 MPa by the lower-pressure pump 7 disposed on a passage P1 and passed through a heat exchanger 102 mounted in an exhaust pipe 101 for the internal combustion engine 1, where it is preheated. The preheated water passed through the heat exchanger 102 is supplied via a passage P2 to a water jacket 105 defined in a cylinder block 103 and a cylinder head 104, and cools heated portions of the internal combustion engine 1 during passing thereof through the jacket 105. In this case, the water itself robs heat of the heated portion, whereby the temperature thereof is further raised. The water exiting from the water jacket 105 is supplied via a passage P3 to a dispensing valve 106, where the water is dispensed into a first system leading to a passage P4, a second system leading to a passage P5, a third system leading to a passage P6 and a fourth system leading to passages P7.

The water dispensed to the first system leading to the passage P4 by the dispensing valve 106 is pressurized to a higher pressure equal to or higher than 10 MPa by th higher-pressure pump 8 and supplied to the evaporator 3, where it is subjected to a heat exchange with an exhaust gas having a higher temperature, whereby it is converted into a high-temperature and high-pressure vapor, and supplied to higher-pressure portions of the expander 4 (cylinders 33 of the expander 4, which will be described hereinafter). On the other hand, the water dispensed to the second system leading to the passage P5 by the dispensing valve 106 is passed through a reducing valve 107 incorporated in the passage P5, whereby it is converted into a vapor having a lower temperature and a lower pressure as compared with the higher temperature and higher-pressure vapor, and supplied to lower-pressure portions of the expander 4 (vane chambers 50 in the expander 4). In this way, the heated water from the dispensing valve 106 is converted into the vapor by the reducing valve 107 and supplied to the lower-pressure portions of the expander 4 and hence, the output from the expander 4 can be increased by effectively utilizing the heat energy received by the water from water jacket 105 of the internal combustion engine 1. The water dispensed to the third system leading to the passage P6 is supplied to portions of the expander 4 which are to be lubricated. At this time, the portions to be lubricated of the expander 4 are lubricated using the high-temperature water heated in the water jacket 105 and hence, the dropped-temperature and dropped-pressure vapor discharged from the expander 4 and containing water is supplied to the condenser 5 incorporated in the passage P8, where it is subjected to a heat exchange with cooling air from a cooling fan 109 driven by an electric motor 108, and the resulting condensed water is discharged into the tank 6. Further, the water dispensed to the fourth system leading to the plurality of passages P7 is supplied to an auxiliary 110 such as a heater for warming a vehicle compartment, a thermoelectric element or the like, where it dissipates a heat, and the resulting dropped-temperature water is discharged to the tank via a check valve 111 incorporated in a passage P9.

The lower-pressure pump 7, the higher-pressure pump 8, the dispensing valve 106 and the electric motor 108 are controlled by the electronic control unit 112 in accordance with the operational state of the internal combustion engine 1, the operational state of the expander 4, the operational state of the auxiliary 110, the temperature of the water in the tank 6 and the like.

The entire structure of the expander 4 will be described below with reference to FIGS. 2 to 6.

The expander 4 has a casing 11, which is formed of first and second casing halves 12 and 13 made of a metal. The first and second casing halves 12 and 13 form main bodies 12a and 13a defining a rotor chamber 14 by cooperation with each other, and circular flanges 12b and 13b integrally with outer peripheries of the main bodies 12a and 13a, respectively. The circular flanges 12b and 13b are coupled to each other through a metal gasket 15. An outer surface of the first casing half 12 is covered with a deep bowl-shaped relay chamber outer-wall 16, and a circular flange 16a integrally connected to an outer periphery of the outer wall 16 is superposed on a left side of the circular flange 12b of the first casing half 12. An outer surface of the second casing half 13 is covered with an exhaust chamber outer-wall 17 in which a magnet coupling (not shown) for transmitting the output from the expander 4 to the outside is accommodated, a circular flange 17a integrally connected an outer periphery of the outer wall 17 is superposed on right side of the circular flange 13b of the second casing half 13. The three circular flanges 12a, 13a 16a and 17a are fastened together by bolts 19 disposed circumferentially. A relay chamber 19 is defined between the relay chamber outer-wall 16 and the first casing half 12, and an exhaust chamber 20 is defined between the exhaust chamber-outer wall 17 and the second casing half 13. The exhaust chamber outer-wall 17 is provided with a discharge bore 17b for guiding the dropped-temperature and dropped-pressure vapor which has finished its work in the expander 4.

The main bodies 12a and 13a of the casing halves 12 and 13 have hollow bearing tubes 12c and 13c protruding outwards, respectively, and a rotary shaft 21 having a hollow 21a is rotatably supported in the hollow bearing tubes 12c and 13c with a pair of bearing members 22 and 23 interposed therebetween. Thus, an axis L of the rotary shaft 21 passes through an intersection between a longer diameter and a shorter diameter in the rotor chamber 14 having a substantially elliptic shape. A smaller-diameter portion 21b of a right end of the rotary shaft 21 protrudes into the exhaust chamber 20 through the hollow bearing tube 13c of the second casing half 13, and a rotor boss 24 of the magnet coupling is spline-coupled to the smaller-diameter portion 21b. An outer periphery of the smaller-diameter portion 21b at the right end of the rotary shaft 21 and an inner periphery of the hollow bearing tube 13c of the second casing half 13 are sealed from each other by a seal member 25, which is fixed to the inner periphery of the hollow bearing tube 13c by a nut 26 threadedly fitted to such inner periphery.

Figure 4:
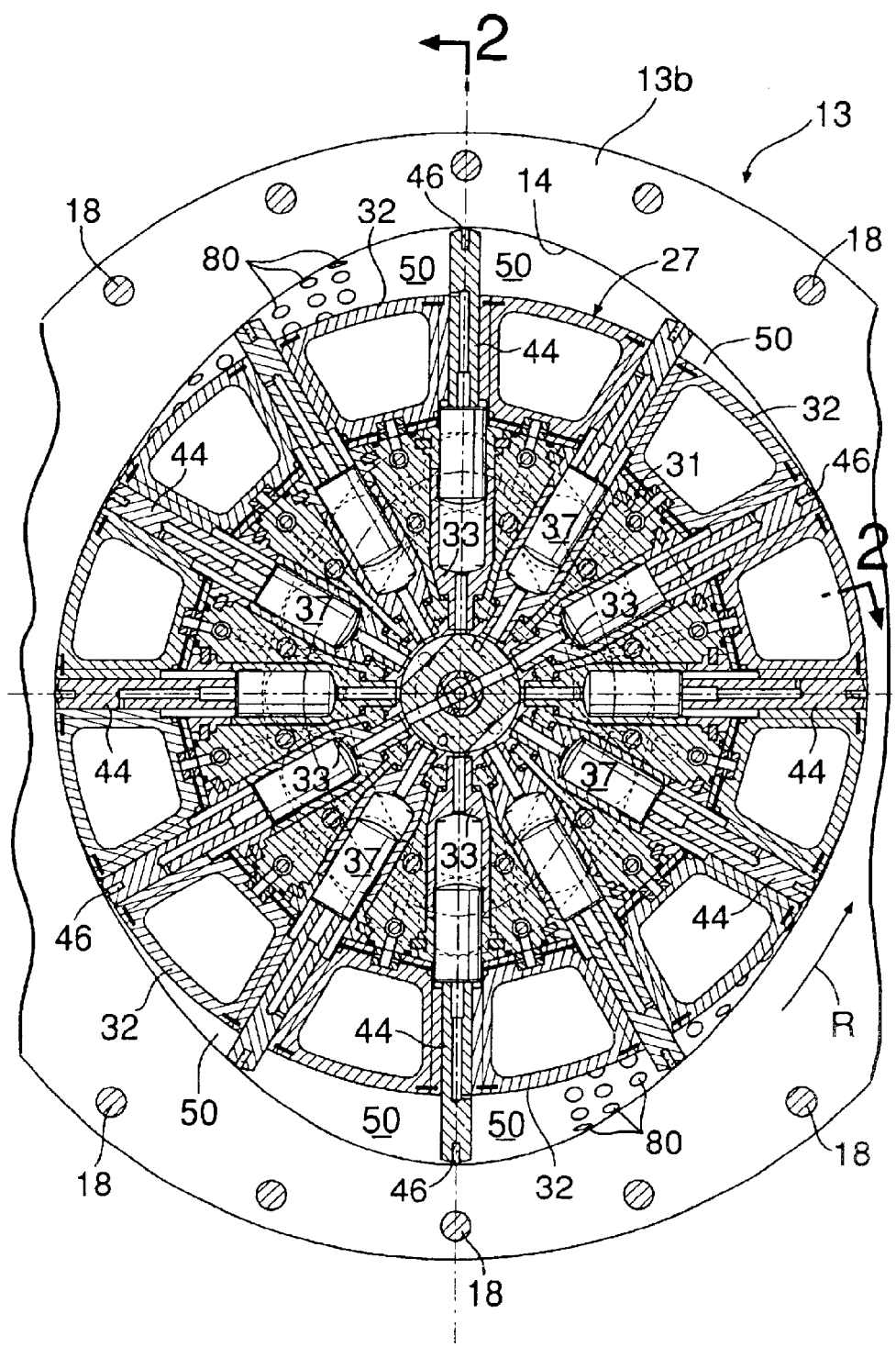
Figure 8:
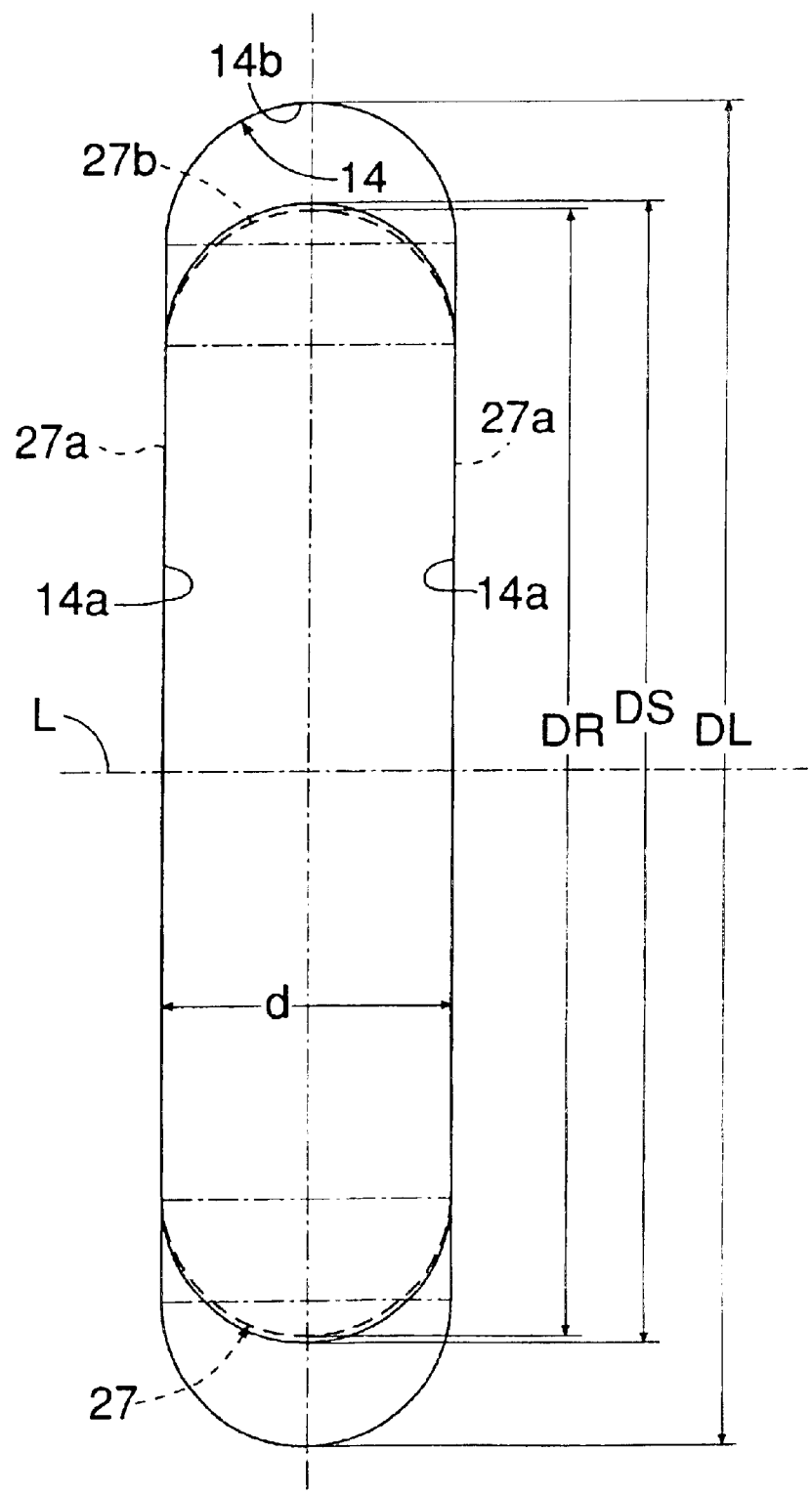

As can be seen from FIGS. 4 and 8, a circular rotor 27 is rotatably accommodated in the rotor chamber 14 having a pseudo elliptic shape. The rotor 27 is fitted over and integrally coupled to an outer periphery of the rotary shaft 21 by a pin 28, and an axis of the rotor 27 and an axis of the rotor chamber 14 are in line with the axis L of the rotary shaft 21. The shape of the rotor chamber 14 as viewed in a direction of the axis L is a pseudo elliptic shape similar to a rhombic shape with four apexes rounded, and the rotor chamber 14 has a longer diameter DL and a shorter diameter DS. The shape of the rotor 27 as viewed in the direction of the axis L is a true circular shape and has a diameter DR slightly smaller than the shorter diameter DS of the rotor chamber 14.

Both of the sectional shapes of the rotor chamber 14 and the rotor 27 as viewed in a direction perpendicular to the axis L are similar to a field competition track. More specifically, the sectional shape of the rotor chamber 14 is formed from a pair of flat faces 14a, 14a extending in parallel to each other at a distance d left therebetween, and an arcuate face 14b having a center angle of 180° and smoothly connecting outer peripheries of the flat faces 14a, 14a to each other, and the sectional shape of the rotor 27 is formed from a pair of flat faces 27a, 27a extending in parallel to each other at a distance d left therebetween, and an arcuate face 27b having a center angle of 180° and smoothly connecting outer peripheries of the flat faces 27a, 27a to each other. Therefore, the flat faces 14a, 14a of the rotor chamber 14 and the flat faces 27a, 27a of the rotor 27 are in contact with each other, and a pair of spaces (see FIG. 4) forming a crescent shape are defined between the inner peripheral surface of the rotor chamber 14 and the outer peripheral surface of the rotor 27.

The structure of the rotor 27 will be described below in detail with reference to FIGS. 3, 6, 9 and 10.

The rotor 27 is formed of a rotor core 31 fixed to the outer periphery of the rotary shaft 21, and twelve rotor segments 32 fixed to cover the periphery of the rotor core 31 and forming an outer profile of the rotor 27. The rotor core 31 includes a disk-shaped main body 31a, and a gear-shaped boss portions 31b, 31b protruding in axially opposite directions from a central portion of the main body 31a. Twelve cylinders 33 made of a ceramic (or carbon) are mounted radially at distances of 30° to the main body 31a and fixed thereto by caps 34 and keys 35, so that they are prevented from being withdrawn. A smaller-diameter portion 33a is projectingly provided at an inner end of each of the cylinders 33, and a base end of the smaller-diameter portion 33a and the main body 31a of the rotor core 31 are sealed from each other through an O-ring 36. A tip end of the smaller-diameter portion 33a is fitted over the outer peripheral surface of the hollow rotary shaft 21, and cylinder bores 33b communicate with the hollow 21a in the rotary shaft 21 through twelve third vapor passages S3 extending through the smaller-diameter portions 33a and the rotary shaft 21. A piston 37 made of a ceramic is slidably received in each of the cylinders 33. When the piston 37 is moved to a radially innermost location, it is retracted and sunk completely in the cylinder bore 33b, and when the piston 37 is moved to a radially outermost location, about half of the entire length thereof protrudes to the outside of the cylinder bore 33b.

Each of the rotor segments 32 is formed of five components coupled to one another. The five components are a pair of block members 38, 38 having hollows 38a, 38a, a pair of side plates 39, 39 made of U-shaped plate materials, and a bottom plate 40 made of a rectangular plate material. These components are integrally connected to one another by brazing.

Two recess s 38b and 38c are defined in an outer peripheral surface of each of the block members 38, namely, a surface opposed to the pair of flat faces 14a, 14a of the rotor chamber 14 to extend in an arcuate shape about the axis L, and lubricating water ejection bores 38d, 38c open into central portions of the recesses 38b and 38c, respectively. A twentieth water passage W20 and a twenty first water passage W21 are provided in a recessed manner in a face of the block member 38, which is coupled to the side plate 39.

An orifice-defined member 41 having twelve orifices is fitted into a central portion of the bottom plate 40, and an O-ring 42 mounted to the bottom plate 40 to surround the orifice-defined member 41 seals the orifice-defined member 41 and the outer peripheral surface of the main body 31a of the rotor core 31 from each other. Fourteenth to nineteenth water passages W14 to W19 are provided two by two in a recessed manner in a surface of the bottom plate 40 coupled to the block member 38 to extend radially from the orifice-defined member 41. The fourteenth to nineteenth water passages W14 to W19 extend toward the surface coupled to the side plate 39.

Twenty second to twenty sixth water passages W22 to W27 are provided in a recessed manner in a surface of each side plate 39 coupled to the block members 38, 38 and the bottom plate 40. The fourteenth water passage W14, the fifteenth water passage W15, the eighteenth water passage W18 and the nineteenth water passage W19 in an outer area of the bottom plate 40 communicate with the twenty second water passage W22, the twenty third water passage 23, the twenty sixth water passage W26 and the twenty seventh water passage W27 in the side plate 39, and the sixteenth water passage W16 and the seventeenth water passage W27 in an inner area of the bottom plate 40 communicate with the twenty fourth water passage W24 and the twenty fifth water passage W25 in the side plate 39 through the twentieth water passage W20 and the twenty first water passage W21 in the block member 38. Outer ends of the twenty second water passage W22, the twenty fifth water passage W25, the twenty sixth water passage W26 and the twenty seventh water passage W27 in the side plate 39 open as four lubricating water ejection bores 39a into the outer surface of the side plate 39. Outer ends of the twenty third water passage W23 and the twenty fourth water passage W24 in the side plate 39 communicate with the lubricating oil ejection bores 38d and 38e in the recesses 38b and 38c through a twenty eighth water passage W28 and a twenty ninth water passage W29 defined in each of the block members 38, 38, respectively. A notch 39b having a partially arcuate section is formed in the outer surface of the side plate 39 in order to avoid the interference with the piston 37 moved radially outwards. The reason why the twentieth water passage W20 and the twenty first water passage W21 are defined in the block member 38 rather than in the side plate 39 is that the side plate 39 has a thickness decreased by provision of the notch 39b, and a thickness enough to define the twentieth water passage W20 and the twenty first water passage W21can be ensured in the block member 38.

As shown in FIGS. 2, 5, 9 and 11, twelve vane grooves 43 are defined between the adjacent rotor segments 32 of the rotor 27 to extend radially, and plate-shaped vanes 44 are slidably received in the vane grooves 43, respectively. Each of the vanes 44 is formed into a substantially U-shape and includes parallel faces 44a, 44a extending along the parallel faces 14a, 14a of the rotor chamber 14, an arcuate face 44b extending along the arcuate face 14b of the rotor chamber 14, and a notch 44c located between the parallel faces 44a, 44a. Rollers 45, 45 having a roller bearing structure are rotatably supported on a pair of support shafts 44d, 44d protruding from the parallel faces 44a, 44a, respectively.

A seal member 46 made of a synthetic resin and formed into a U-shape is retained on the arcuate face 44b of the vane 44, and has a tip end protruding slightly from the arcuate face 44b of the vane 44 to come into sliding contact with the arcuate face 14b of the rotor chamber 14. Sliding members 47, 47 made of a synthetic resin are fixed to the parallel faces 44a, 44a of the vane 44 to come into sliding contact with the parallel faces 14a, 14a of the rotor chamber 14. Sliding members 48, 48 of a synthetic resin are also fixed to opposite sides of the notch 44c of the vane 44 to come into sliding contact with the main body 31a of the rotor core 31. Two recesses 44e, 44e are defined in each of opposite sides of the vane 44 and opposed to radially inner two of the four lubricating water ejection bores 39a opening into the outer surfaces of the side plates 39, 39 of the rotor segment 32. A projection 44f provided at a central portion of the notch 44c of the vane 44 in a protruding manner to face radially inwards abuts against a radially outer end of the piston 37. A water discharge passage 44g is defined in the vane to extend radially, and opens at its radially inner end into a tip end of the projection 44f and at its radially outer end into one of sides of the vane 44. A location at which the water discharge passage 44g opens into the one side of the vane 44 faces to a point radially outer than the arcuate face 27b of the rotor 27, when the vane 44 is moved to protrude to the radially outermost position.

Annular grooves 49, 49 having a pseudo elliptic shape similar to a rhombic shape with four apexes rounded are provided in a recessed manner in the flat faces 14a, 14a of the rotor chamber 14 defined by the first and second casing halves 12 and 13, and the pair of rollers 45, 45 of each of the vanes 44 are rollably engaged in the annular grooves 49, 49. The distance between each of the annular grooves 49, 49 and the arcuate face 14b of the rotor chamber 14 is constant over the entire periphery. Therefore, when the rotor 44 is rotated, the vane 44 with the rollers 45, 45 guided in the annular grooves 49, 49 is reciprocally moved radially within the vane groove 43 and slid along the arcuate face 14b of the rotor chamber 14 in a state in which the seal member 46 mounted to the arcuate face 44b of the vane 44 has been compressed at a given amount. Thus, it is possible to reliably seal the vane chambers 50 defined between the adjacent vanes 44, while preventing the rotor chamber 14 and the vanes 44 from being brought into direct solid contact with each other to prevent an increase in sliding resistance and the occurrence of the wearing.

A pair of circular seal grooves 51, 51 are defined in the flat faces 14a, 14a of the rotor chamber 14 to surround the outer sides of the annular grooves 49, 49. A pair of ring seals 52 each having two O-rings 52 and 53 are slidably received in the circular seal grooves 51, respectively, and have sealing faces opposed to the recesses 38b and 38c defined in each of the rotor segments 32. The pair of ring seals 54, 54 are prevented from being turned relative to the first and second casing halves 12 and 13 by knock pins 55, 55, respectively.

Figure 9:
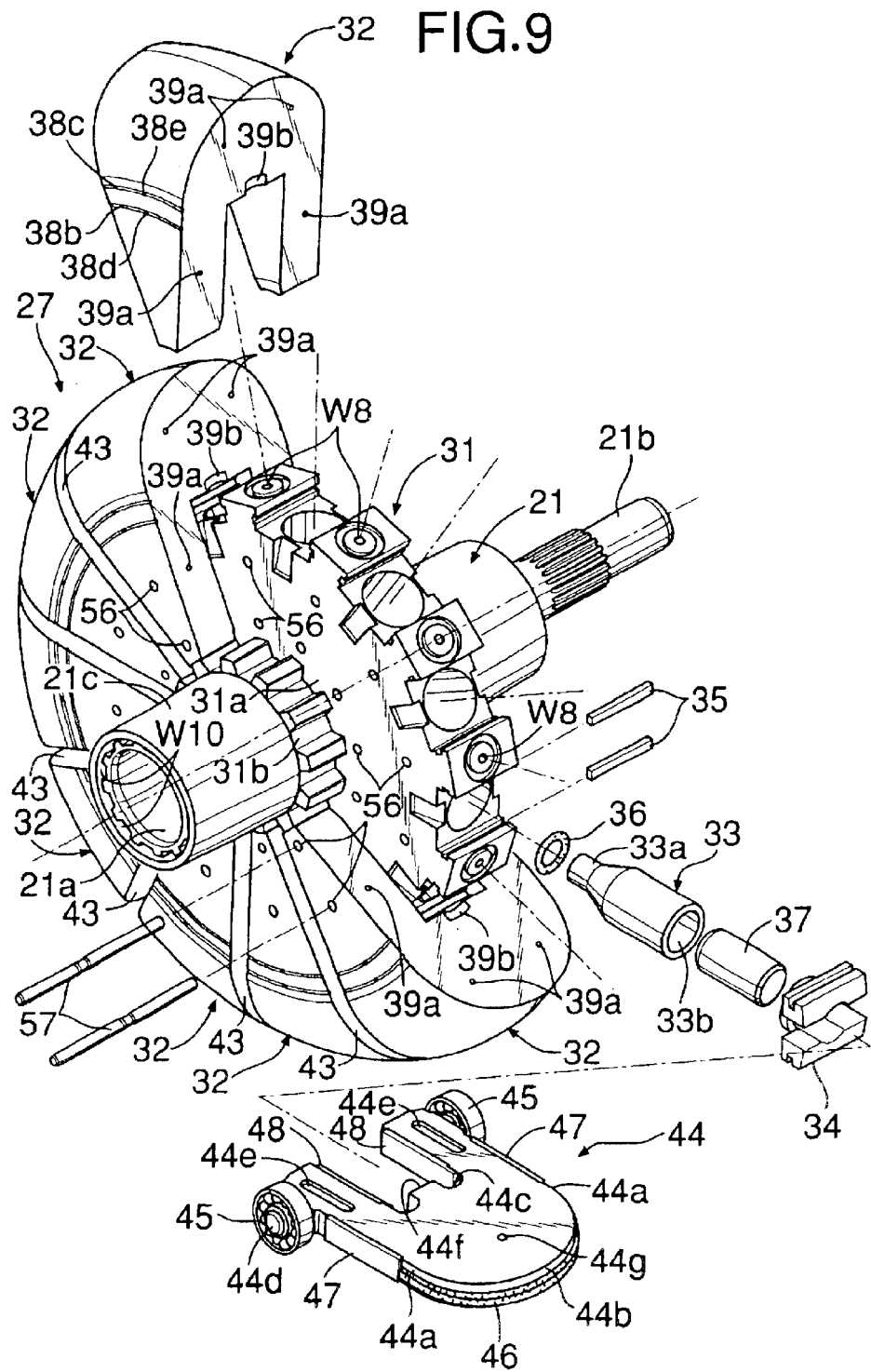
Figure 10:
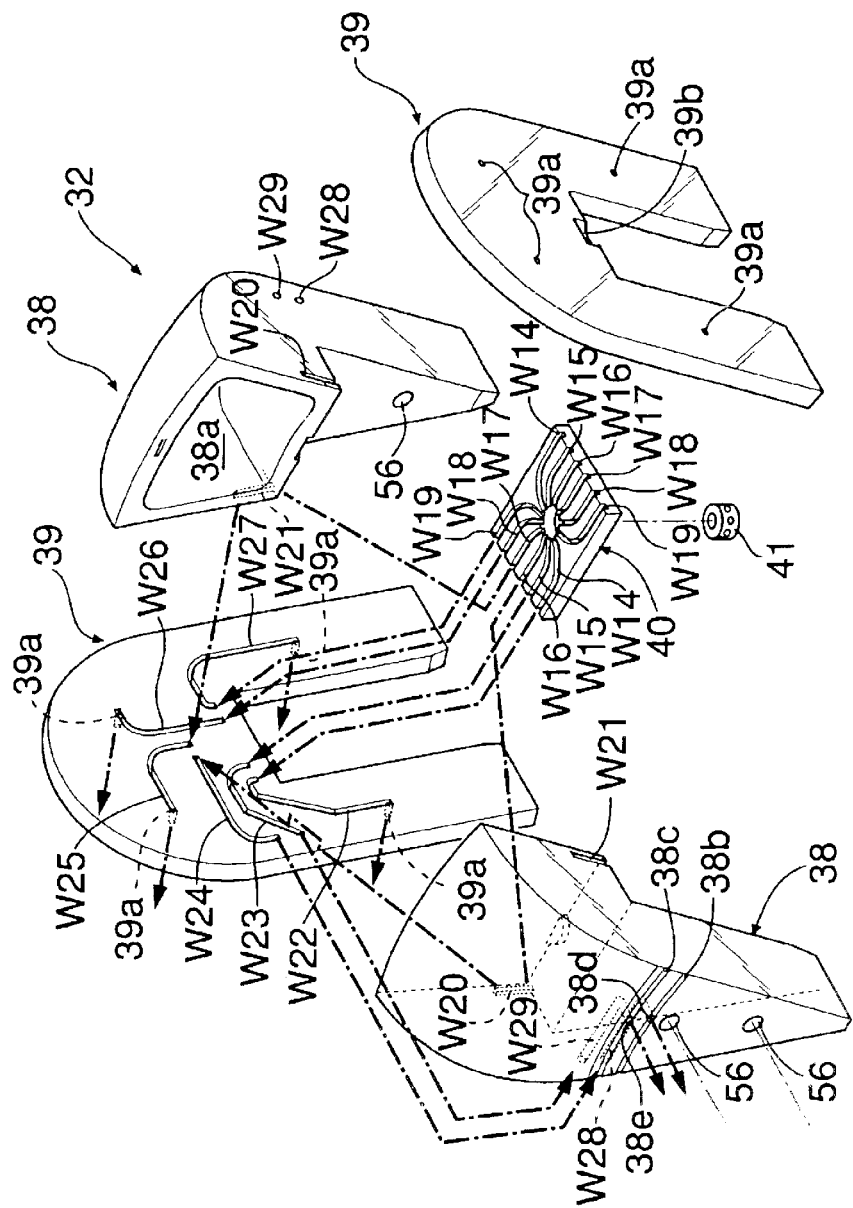
Figure 11:
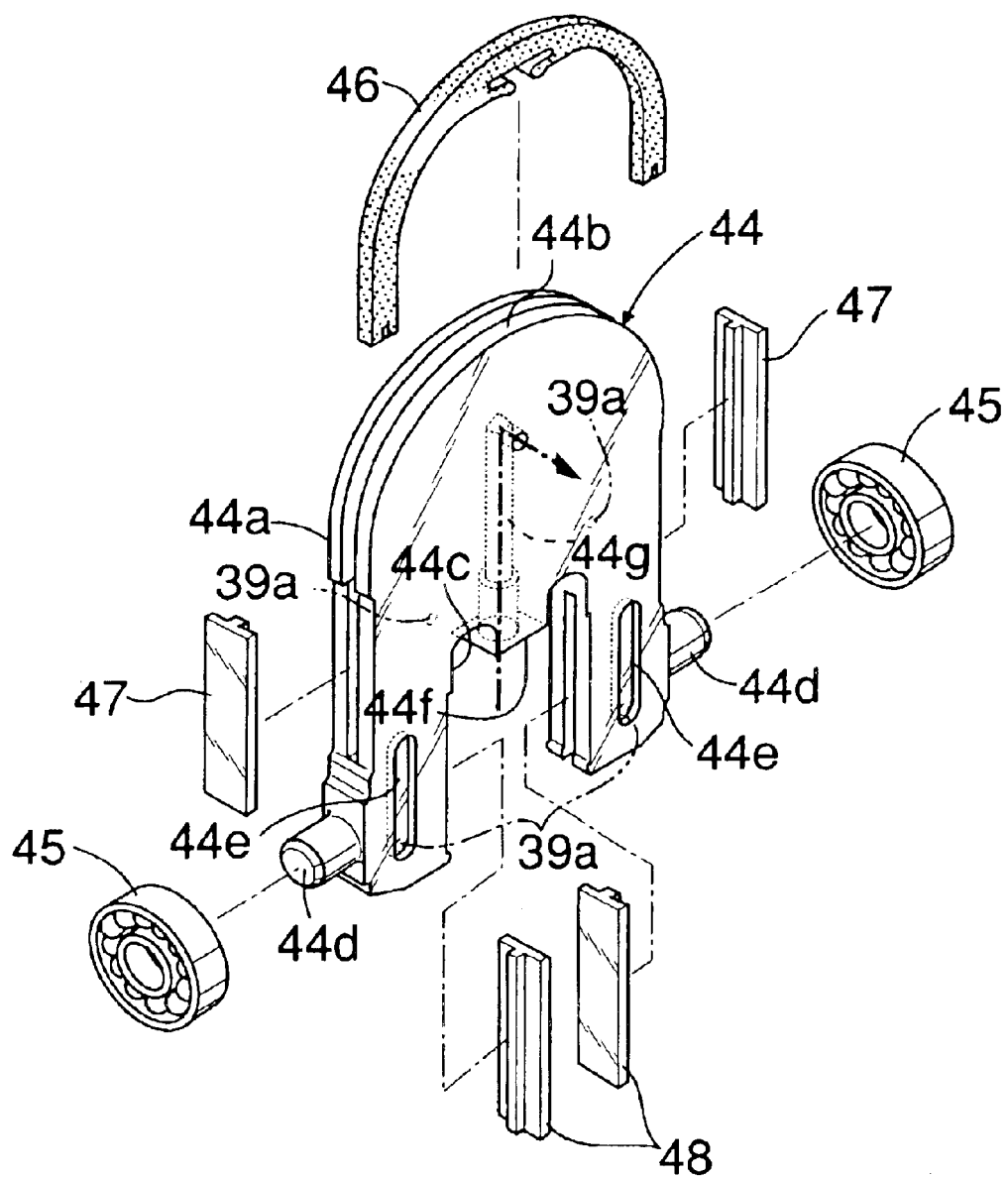

The assembling of the rotor 27 is carried out in the following manner: In FIG. 9, the twelve rotor segments 32 are fitted over the outer periphery of the rotor core 31 having the cylinders 33, the caps 34 and the keys 35 previously assembled thereto, and the vanes 44 are fitted into the twelve vane grooves 43 defined between the adjacent rotor segments 32. At this time, a shim having a predetermined thickness is disposed on each of opposite sides of each vane 44 in order to define a clearance between each of the vanes 44 and each of the side plates 39 of the rotor segments 32. In this state, the rotor segments 32 and the vanes 44 are tightened radially inwards to the rotor core 31 using a jig, and the rotor segments 32 are positioned accurately relative to the rotor core 31. Thereafter, the rotor segments 32 are temporarily fixed to the rotor core 31 by temporarily fixing bolts 58 (see FIG. 2). Then, the rotor 27 is removed from the jig, and the pinholes 56, 56 are made in each of the rotor segments 32 to extend through the rotor core 31. The knock pins 57, 57 are press-fitted into the pinholes 56, 56, whereby rotor segments 32 are coupled to the rotor core 31.

Figure 3:
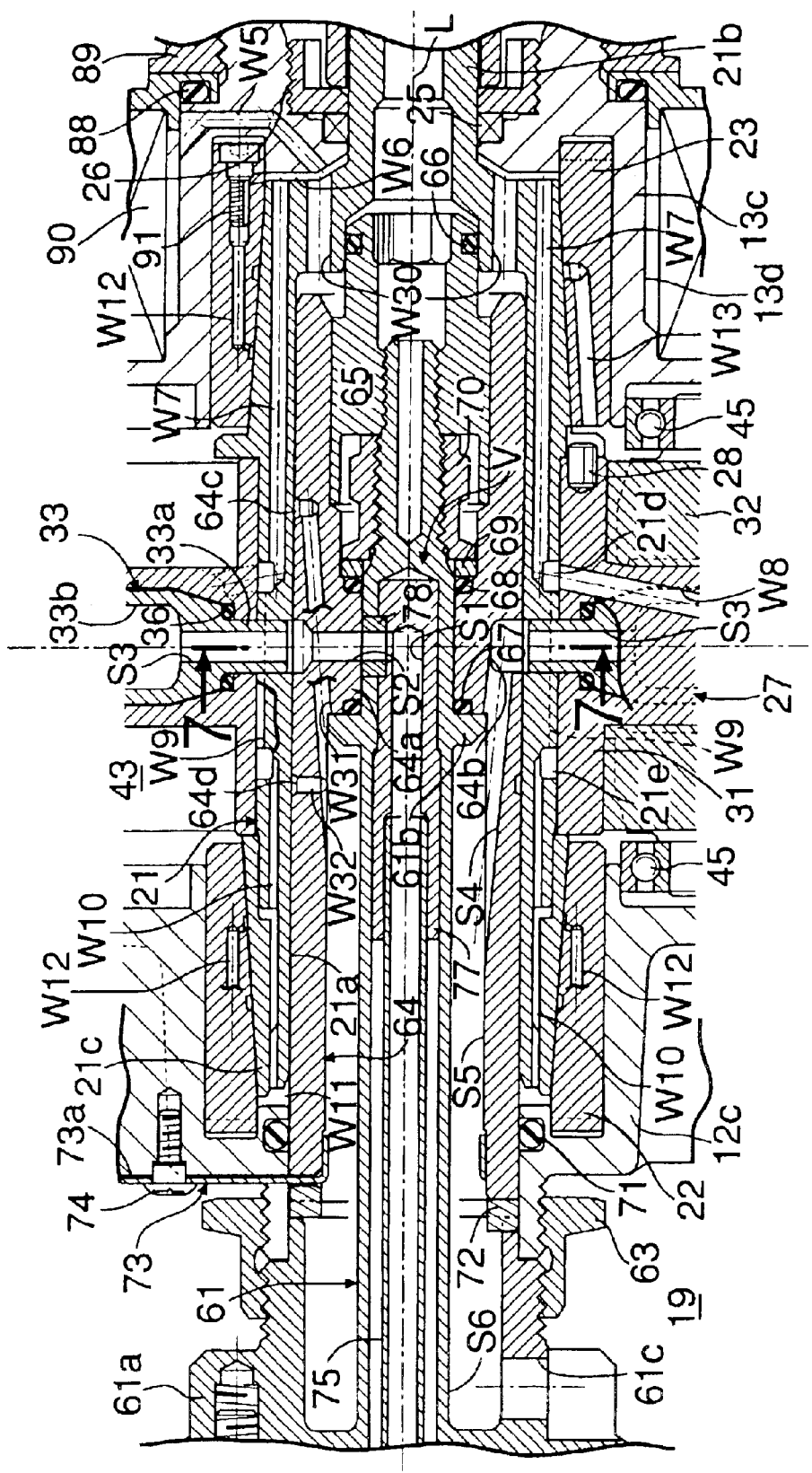
Figure 7:
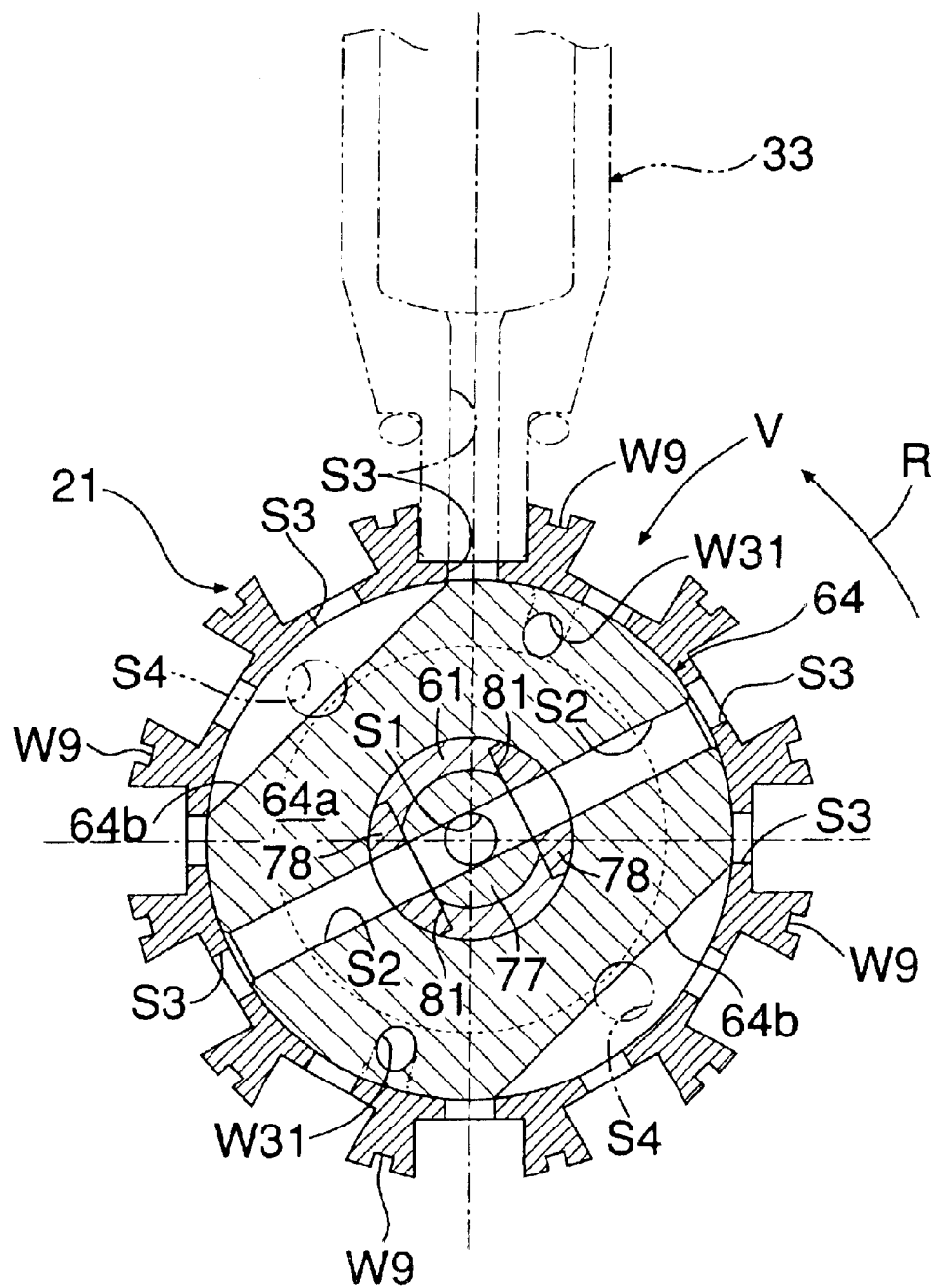
Figure 12:
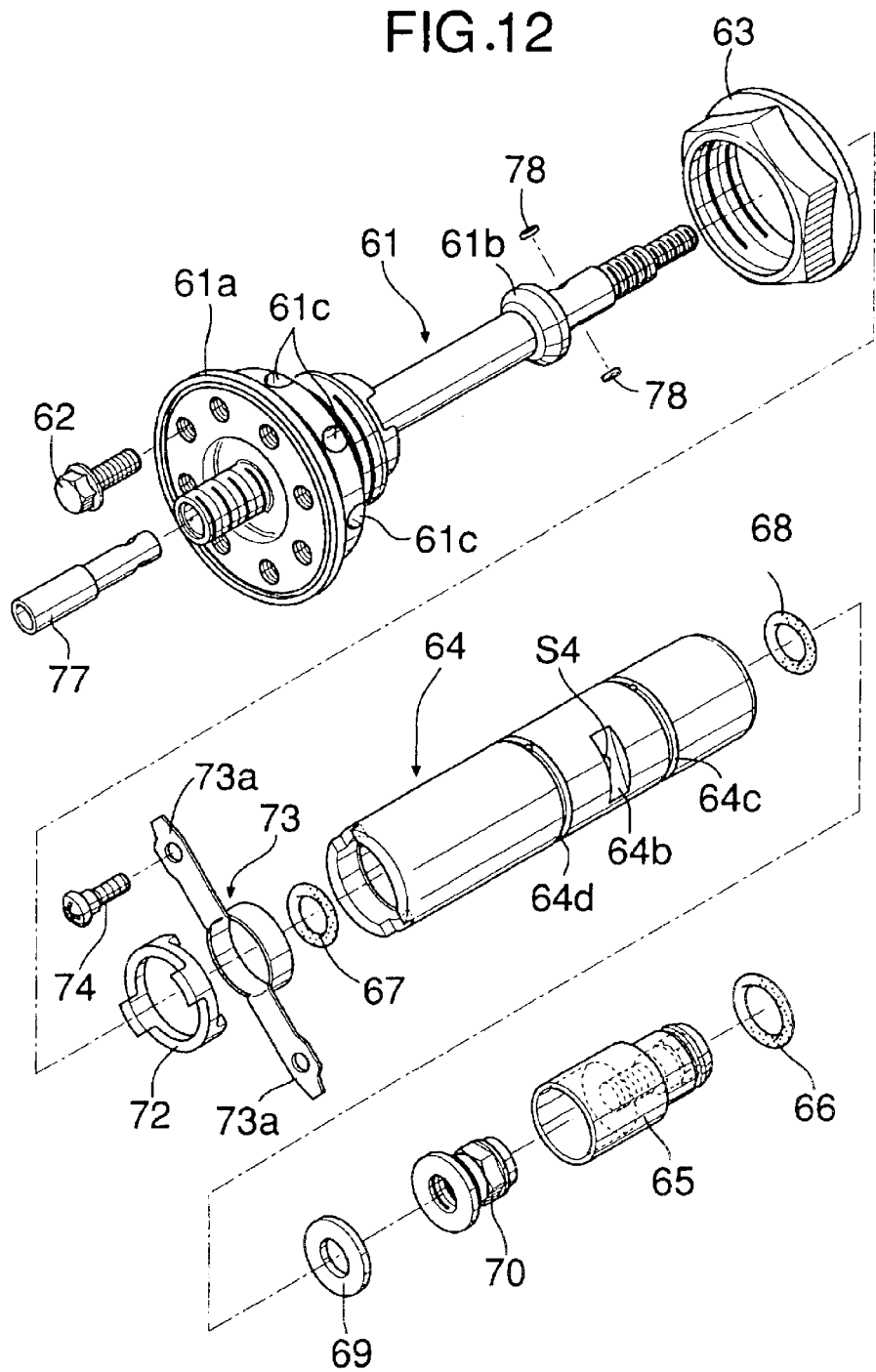

As can be seen from FIGS. 3, 7 and 12, the pair of bearing members 22 and 23 supporting the outer peripheral surface of the rotary shaft 21 has an inner peripheral surface which is tapered, so that its diameter is increased toward the rotor 27. The axially outer ends of the bearing members 22 and 23 are engaged in the hollow bearing tubes 12c and 13c of the first and second casing halves 12 and 13, so that they are prevented from being turned. It should be noted that the outer periphery at the left and of the rotary shaft 21 supported in the left hollow bearing tube 12c is constituted by a different member 21c in order to enable the assembling of the rotor 27 to the rotary shaft 21.

An opening 16b is defined in the center of the relay chamber outer-wall 16, and a boss portion 61a of a valve housing 61 disposed on the axis L is fixed to an inner surface of the opening 16b by a plurality of bolts 62 and also fixed to the first casing half 12 by a nut 63. A cylindrical first fixing shaft 64 is relatively rotatably fitted in the hollow 21a in the rotary shaft 21, and a second fixing shaft 65 is coaxially fitted to an inner periphery of a right end of the first fixing shaft 64. An outer peripheral portion of a right end of the second fixing shaft 65 protruding from the first fixing shaft 64 and the hollow 21a in the rotary shaft 21 are sealed from each other by an O-ring 66. The valve housing 61 extending within the first fixing shaft 64 includes a flange 61b, and an O-ring 67, a thickened portion 64a of the first fixing shaft 64, an O-ring 68, a washer 69, a nut 70 and the second fixing shaft 65 are fitted sequentially at the right of the flange 61b. The nut 70 and the second fixing shaft 65 are threadedly coupled to the valve housing 61 and hence, the thickened portion 64a of the first fixing shaft 64 is positioned between the flange 61b of the valve housing 61 and the washer 69 with the pair of O-rings 66 and 67 interposed therebetween.

The first fixing shaft 64 supported on the inner periphery of the hollow bearing tube 12c of the first casing half 12 with an O-ring 71 interposed therebetween is connected at its left end to the boss portion 61a of the valve housing 61 by a ring-shaped Oldham coupling 72, and the deflection of the rotor 27 supported on the outer periphery of the first fixing shaft 64 through the rotary shaft 21 can be permitted by permitting the radial deflection of the first fixing shaft 64 by the Oldham coupling 72. In addition, the first fixing shaft 64 is prevented from being turned relative to the casing 11 by fixing arms 73a, 73a of a detent member 73 loosely fitted in the left end of the first fixing shaft 64 to the first casing half 12 by bolts 74, 74.

A vapor supply pipe 75 is fitted within the valve housing 61 disposed on the axis L and is fixed to the valve housing 61 by a nut 76. The vapor supply pipe 75 is connected at its right end to a nozzle member 77 press-fitted into the valve housing 61. A pair of recesses 81, 81 (see FIG. 7) are defined at a phase difference of 180° astride the valve housing 61 and a tip end of the nozzle member 77, and annular joint members 78, 78 are fitted into and retained in the recesses 81, 81. A first vapor passage S1 is defined axially in the center of the nozzle member 77 to lead to the vapor supply pipe 75, and a pair of second vapor passages S2, S2 are provided at a phase difference of 180° to extend axially through the thickened portion 64a of the first fixing shaft 64. A terminal end of the first vapor passage S1 and radially inner ends of the second vapor passages S2, S2 are always in communication with each other through the joint members 78, 78. Twelve third vapor passages S3 are provided to extend through the rotary shaft 21 and the smaller-diameter portions 33a of the twelve cylinders 33 retained at the distances of 30° in the rotor 27 fixed to the rotary shaft 21, as described above. Radially inner ends of the third vapor passages S3 are opposed to radially outer ends of the second vapor passage S2, S2 to be able to communicate with them.

A pair of notches 64b, 64b are defined at a phase difference of 180° in the outer peripheral surface of the thickened portion 64a of the first fixing shaft 64, and are capable of communicating with the third vapor passages S3. The notches 64b, 64b he relay chamber 19 communicate with each other through a pair of fourth vapor passages S4, S4 defined obliquely in the first fixing shaft 64, a fifth vapor passage S5 defined axially in the first fixing shaft 64, a sixth vapor passage S6 defined in the boss portion 61a of the valve housing 61 and through-bores 61c which open into an outer periphery of the boss portion 61a of the valve housing 61.

Figure 5:
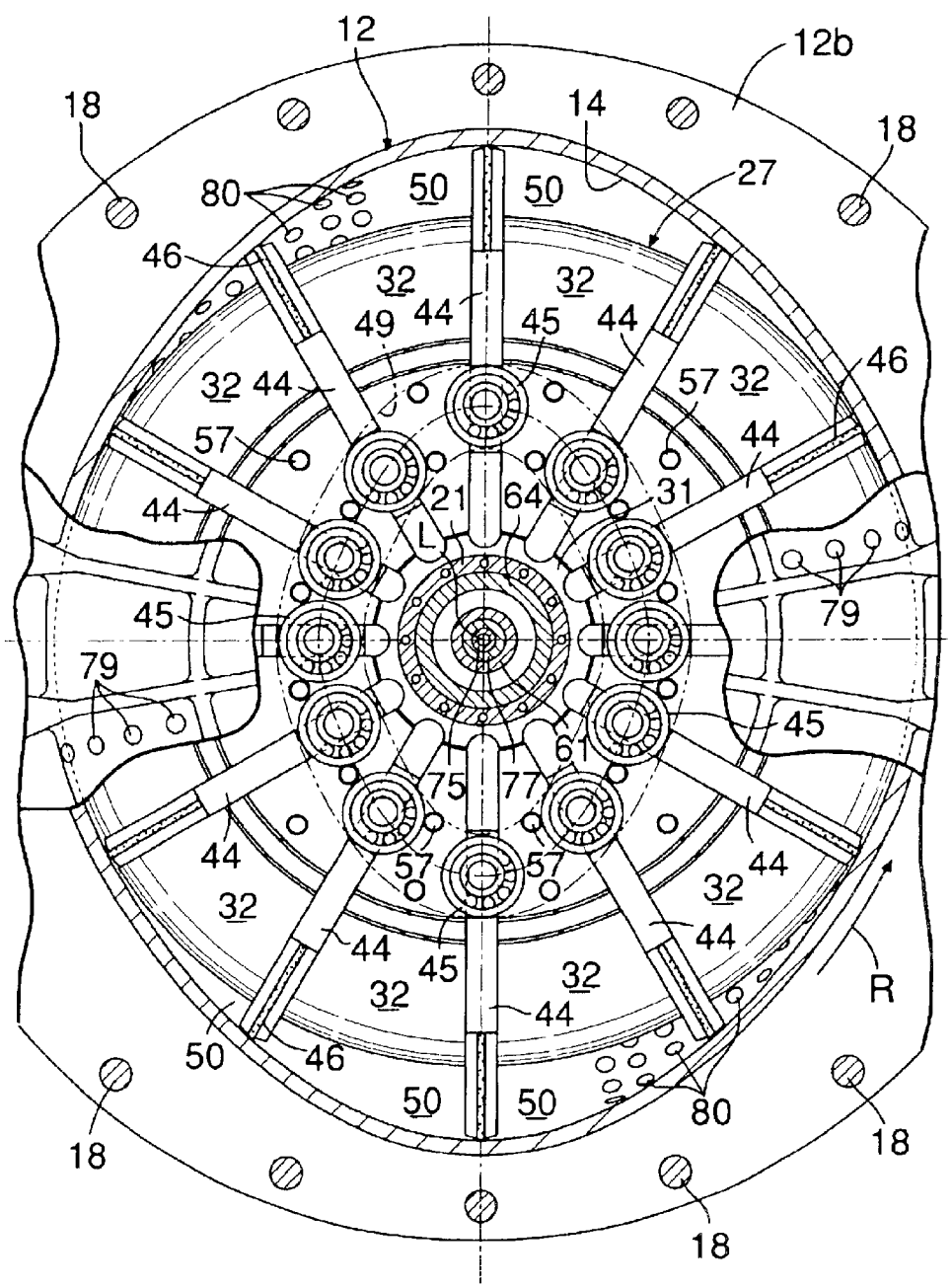

As shown in FIG. 5, a plurality of intake ports 79 are defined in a radial arrangement in the first casing half 12 at locations advanced at an angle of 15° in a direction of rotation of the rotor 27, based on a direction of the shorter-diameter of the rotor chamber 14. The internal space in the rotor chamber 14 communicates with the relay chamber 19 by virtue of the intake ports 79. A large number of exhaust ports 80 are provided and arranged in a plurality of radial arrays in the second casing half 13 at locations delayed at an angle of 15° to 75° in the direction of rotation of the rotor 27, based on the direction of the shorter-diameter of the rotor chamber 14. The internal space in the rotor chamber 14 communicates with the exhaust chamber 20 by virtue of the exhaust ports 80.

A rotary valve V is formed to permit the periodical communication of the second vapor passages S2, S2 and the third vapor passages S3 with each other as well as the periodical communication of the notches 64b, 64b in the first fixing shaft 64 and the third vapor passages S3 with each other by relative rotation of the first fixing shaft 64 and the rotary shaft 21.

Figure 2:
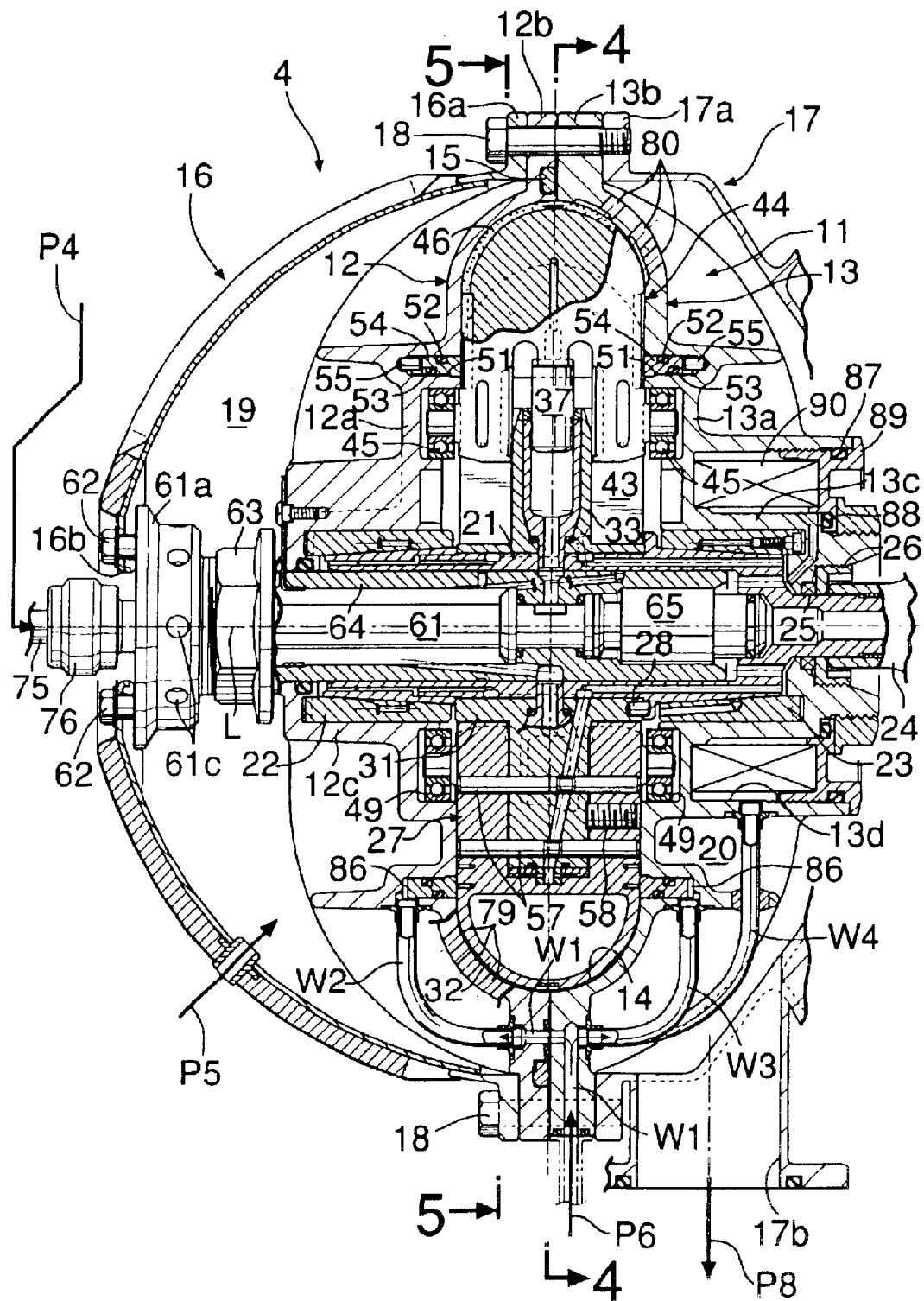

As can be seen from FIGS. 2 and 3, pressure chambers 86, 86 are defined in backs of the ring seals 54, 54 fitted in the circular seal grooves 51, 51 in the first and second casing halves 12 and 13, and a first water passage W1 defined in the first and second casing halves 12 and 13 communicates with both of the pressure chambers 86, 86 through a second water passage W2 and a third water passage W each forming a pipe. A filter chamber 13d capable of being opened and closed by a cover 89 provided with two O-rings 87 and 88 is defined radially outside the hollow bearing tube 13c of the second casing half 13, and an annular filter 90 is accommodated in the filter chamber 13d. The first water passage W1 in the second casing half 13 communicates with an outer peripheral surface of the filter 90 through a fourth water passage W4 forming a pipe, and an inner peripheral surface of the filter 90 communicates with a sixth annular water passage W6 defined between the second casing half 13 and the rotary shaft 21 through a fifth water passage W5 defined in the second casing half 13. The sixth water passage W6 communicates with the twelve orifice-defined members 41 through twelve seventh water passages W7 extending axially within the rotary shaft 21, an annular groove 21d defined in the outer periphery of the rotary shaft 21 and twelve eighth water passages W8 extending radially within the rotor core 31, respectively.

The annular groove 21d defined in the outer periphery of the rotary shaft 21 communicates with an annular groove 21e defined in the outer periphery of the rotary shaft 21 through twelve ninth water passages W9 (see FIG. 7) extending axially, and the annular groove 21e communicates with an eleventh annular water passage W11 defined between the left end of the rotary shaft 21 and the first housing half 12 through twelve tenth water passages W10 extending axially within the rotary shaft 21. The sixth annular water passage W6 and the eleventh annular water passage W11 communicate with sliding surfaces between the inner peripheries of the bearing members 22 and 23 and the outer periphery of the rotary shaft 21 through orifices around outer peripheries of orifice-defining bolts 91 threadedly fitted in the bearing members 22 and 23 and further via twelfth water passages W12 defined in the bearing members 22 and 23. The sliding surfaces between the inner peripheries of the bearing members 22 and 23 and the outer periphery of the rotary shaft 21 communicate with the vane grooves 43 via thirteenth draining water passages W13.

The sixth annular water passage W6 communicates with sliding portions between the inner peripheral surface of the hollow 21a in the rotary shaft 21 and the outer peripheral surface of the right end of the first fixing shaft 64 via two thirtieth water passages W30, W30 provided axially in the rotary shaft 21. A seal groove 64c defined at the right of the thickened portion 64a of the first fixing shaft 64 communicates with the fifth vapor passage S5 through thirty first water passages W31, W31 provided obliquely in the first fixing shaft 64. The eleventh annular water passage W11 communicates with sliding portions between the inner peripheral surface of the hollow 21a in the rotary shaft 21 and the outer peripheral surface of the left end of the first fixing shaft 64, and a seal groove 64d defined at the left of the thickened portion 64a of the first fixing shaft 64 communicates with the fifth vapor passage S5 through thirty second water passages S32, W32 extending radially through the first fixing shaft 64 and the thirty first water passages W31, W31.

As can be seen from the comparison of FIGS. 1 and 2 with each other, the high-temperature and high-pressure vapor from the evaporator 3 is supplied via the passage P4 to the vapor supply pipe 75 for the expander 4; the vapor from the reducing valve 107 located downstream of the dispensing valve 106 is supplied via the passage P5 into the relay chamber 19 in the expander 4, and the high-temperature water from the dispensing valve 106 is supplied via the passage P6 to the first water passage W1; the dropped-temperature and dropped-pressure vapor from the discharge bore 17b in the expander 4 is discharged to the passage P8.

The operation of the present embodiment having the above-described arrangement will be described below.

Figure 6:
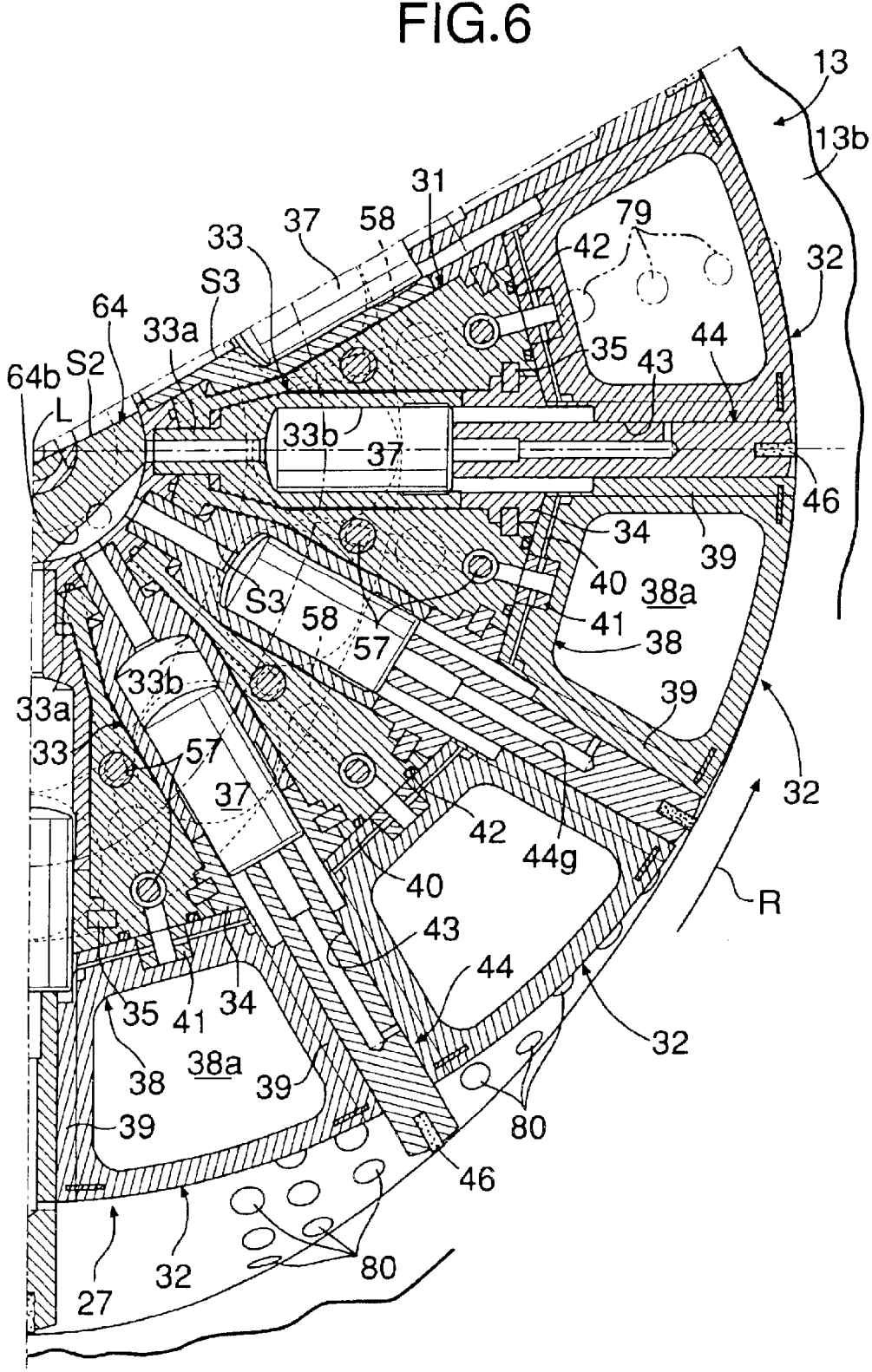

First, the operation of the expander 4 will be described. Referring to FIG. 3, the high-temperature and high-pressure vapor from the passage P4 leading to a downstream side of the evaporator 3 is supplied to the vapor supply pipe 75, the first vapor passage S1 defined axially in the nozzle member 77 and the pair of second vapor passages S2, S2 extending radially through the nozzle member 77, the joint members 78, 78 and the thickened portion 64a of the first fixing shaft 64. Referring to FIGS. 6 and 7, when the rotary shaft 21 rotated in unison with the rotor 27 reaches a predetermined phase, the pair of third vapor passages S3, S3 existing at the locations advanced in the direction of rotation of the rotor 27 shown by an arrow R from a shorter diameter position of the rotor chamber 14 are put into communication with the pair of second vapor passages S2, S2, whereby the high-temperature and high-pressure vapor in the second vapor passages S2, S2 is supplied into the pair of cylinders 33, 33 via the third vapor passages S3, S3 to urge the pistons 37, 37 radially outwards. When the vanes 44, 44 urged by the pistons 37, 37 are moved radially outwards, the advancing movements of the pistons 37, 37 are converted into the rotational movement of the rotor 27 by the engagement of the pair of rollers 45, 45 mounted on the vanes 44, 44 and the annular grooves 49, 49 with each other.

Even after the communication between the second vapor passages S2, S2 and the third vapor passages S3, S3 is blocked with the rotation of the rotor 27 in the direction indicated by the arrow R, the pistons 37, 37 are further advanced by the further continuation of the expansion of the high-temperature and high-pressure vapor within the cylinders 33, 33, whereby the rotation of the rotor 27 is continued. When the vanes 44, 44 reach a longer-diameter position of the rotor chamber 14, the third vapor passages S3, S3 leading to the corresponding cylinders 33, 33 are put into communication with the notches 64b, 64b of the first fixing shaft 64, and the pistons 37, 37 urged by the vanes 44, 44 with the rollers 45, 45 guided in the annular grooves 49, 49 are moved radially inwards, whereby the vapor in the cylinders 33, 33 is passed through the third vapor passages S3, S3, the notches 64b, 64b, the fourth vapor passages S4, S4, the fifth vapor passage S5, the sixth vapor passage S6 and the through-bores 61c and supplied as a first dropped-temperature and dropper-pressure vapor into the relay chamber 19. The first dropped-temperature and dropper-pressure vapor is a vapor resulting from the high-temperature and high-pressure vapor which has been supplied from the vapor supply pipe 75 and has finished its work for driving the pistons 37, 37, resulting in its temperature and pressure dropped. The own heat energy and the pressure energy of the first dropped-temperature and dropper-pressure vapor are reduced, as compared with those of the high-temperature and high-pressure vapor, but are still sufficient to drive the vanes 44.

The vapor is supplied from the reducing valve 107 located downstream of the dispensing valve 106 via the passage P5 to the relay chamber 19, where it is joined and mixed homogeneously with the first dropped-temperature and dropped-pressure vapor.

The first dropped-temperature and dropped-pressure vapor and the vapor from the dispensing valve 106 mixed in the relay chamber 19 are supplied from the intake ports 79 in the first casing half 12 into the vane chambers 50 in the rotor chamber 14, namely, the space defined by the rotor chamber 14, the rotor 27 and the pair of adjacent vanes 44, 44, where the vapor is expanded to rotate the rotor 27. A second dropped-temperature and dropped-pressure vapor resulting from the first dropped-temperature and dropped-pressure vapor finishing its work, resulting in its temperature and pressure dropped, is discharged from the exhaust ports 80 in the second casing half 13 into the exhaust chamber 20 and supplied therefrom via the discharge bore 17b into the condenser 5.

In this manner, the twelve pistons 37 are operated sequentially by the expansion of the high-temperature and high-pressure vapor to rotate the rotor 27 through the rollers 45, 45 and the annular grooves 49, 49, and an output is produced from the rotary shaft 21 by rotating the rotor 27 through the vanes 44 by the expansion of the first dropped-temperature and dropped-pressure vapor resulting from the dropping in temperature and pressure of the high-temperature and high-pressure vapor and the expansion of the vapor from the dispensing valve 106.

The lubrication of various sliding portions of the expansion 4 by the water will be described below. The lubricating water is supplied from the dispensing valve 106 via the passage P6 to the first water passage W1 in the casing 11.

The water supplied to the first water passage W1 is supplied via the second water passage W2 and the third water passage each forming a pipe to the pressure chambers 86, 86 in the bottoms of the circular seal grooves 51, 51 in the first casing half 12 and the second casing half 13, thereby biasing the ring seals 54, 54 toward the side of the rotor 27. The water supplied from the first water passage W1 to the fourth water passage W4 forming the pipe, after being filtered by the filter 90 to remove a foreign matter, is supplied to the fifth water passage W5 defined in the second casing half 13, the sixth water passage W6 defined between the second casing half 13 and the rotary shaft 21, the seventh water passages W7 defined within the rotary shaft 21, the annular groove 21d in the rotary shaft 21 and the eighth water passages W8 defined in the rotor core 31, where the water is further pressurized by the centrifugal force produced with the rotation of the rotor 27 and then supplied to the orifice-defined members 41 of the rotor segments 32.

In each of the rotor segments 32, the water flowing through the orifice-defined member 41 into the fourteenth water passage 14 in the bottom plate 40 is passed through the twenty second water passage W22 in the side plate 39 and ejected from the lubricating water ejection bores 39a, and the water flowing through the orifice-defined member 41 into the seventeenth water passage W17 in the bottom plate 40 is passed through the twenty first water passage W21 in the block member 38 and the twenty fifth water passage W25 in the side plate 39 and ejected from the lubricating water ejection bores 39a. The water flowing through the orifice-defined member 41 into the eighteenth water passage W18 in the bottom plate 40 is passed through the twenty sixth water passage W26 in the side plate 39 and ejected from the lubricating water ejection bores 39a, and the water flowing through the orifice-defined member 41 into the nineteenth water passage W19 in the bottom plate 40 is passed through the twenty seventh water passage W27 in the side plate 39 and ejected from the lubricating water ejection bores 39a. Lower two of the four lubricating water ejection bores 39a opening into the surface of the side plate 39 communicate with the insides of the recesses 44e, 44e in the two vanes 44.

The water flowing through the orifice-defined member 41 into the fifteenth water passage W15 in the bottom plate 40 is passed through the twenty third water passage W23 in the side plate 39 and the twenty ninth water passage W29 in the block member 38 and ejected from the lubricating water ejection bore 38e within the recess 38c, and the water flowing through the orifice-defined member 41 into the sixteenth water passage W16 in the bottom plate 40 is passed through the twentieth water passage W20 in the block member 38, the twenty fourth water passage W24 in the side plate 39 and the twenty eighth water passage W28 in the block member 38 and ejected from the lubricating water ejection bore 38d within the recess 38b.

The water ejected from the lubricating water ejection bores 39a in the side plate 39 of each of the rotor segments 32 into the vane groove 43 forms a static pressure bearing between the vane groove 43 and the vane 44 slidably fitted in the vane groove 43 to support the vane 44 in a floated state, thereby preventing the solid contact of the side plate 39 of the rotor segment 32 and the vane 44 with each other to prevent the occurrences of the seizure and the wearing. By supplying the water for lubricating the sliding surface of the vane 33 through the eighth water passage W8 provided radially in the rotor 27 in the above manner, the water can be pressurized by the centrifugal force, but also the temperature around the rotor 27 can be stabilized to reduce the influence due to the thermal expansion, and the set clearance can be maintained to suppress the leakage of the vapor to the minimum.

A circumferential load applied to each of the vanes 44 (a load in a direction perpendicular to the plate-shaped vane 44) is a resultant force derived from a load due to a difference between vapor pressures applied to the front and rear surfaces of the vane within the rotor chamber 14 and circumferential components of reaction forces received from the annular grooves 49, 49 by the rollers 45, 45 mounted on the vane 44, but these loads are varied periodically depending on the phase of the rotor 27. Therefore, the vane 44 receiving such unbalanced load periodically shows such a behavior that it is inclined within the vane groove 43.

If the vane 44 is inclined by the unbalanced load in this manner, the clearance between the vane 44 and the four lubricating water discharge bores 39a opening into the side plates 39, 39 of the rotor segments 32 on opposite sides of the vane 44 is varied and hence, the water film in the widened portion of the clearance is carried away, and it is difficult for the water to be supplied into the narrowed portion of the clearance. For this reason, there is a possibility that the pressure is not built up at the sliding portions, whereby the vane 44 is brought into direct contact with the sliding surfaces of the side plates 39, 39 to become worn. According to the present embodiment, however, the water is supplied through the orifices into the lubricating water discharge bores 39a by the orifice-defined member 41 mounted on the rotor segment 32 and hence, the above-described disadvantage is overcome.

More specifically, when the clearance between the lubricating water discharge bores 39a and the vane 44 is widened, the pressure of water supplied is constant and hence, the flow rate of the water is increased by an increase in amount of water flowing out of the clearance relative to a constant pressure difference produced across the orifice in a steady state, whereby the pressure difference across the orifice is increased by virtue of an orifice effect, leading to a reduction in the pressure in the clearance, and as a result, a force for narrowing the widened clearance back to the original width is generated. When the clearance between the lubricating water discharge bores 39a and the vane 44 is narrowed, the amount of water flowing out of the clearance is reduced, leading to a reduction in pressure difference across the orifice, and as a result, a force for widening the clearance narrowed due to the in crease in pressure in the clearance back to the original width is generated.

Even if the clearance between the lubricating water discharge bores 39a and the vane 44 is varied by the load applied to the vane 44, as described above, the orifices automatically regulate the pressure of the water supplied to the clearance depending on the variation in size of the clearance and hence, the clearance between the vane 44 and each of the side plates 39, 39 of the rotor segments 32 on the opposite sides of the vane 44 can be maintained at a desired size. Thus, the water film can be always retained between the vane 44 and each of the side plates 39, 39 to support the vane in the floated state, thereby reliably avoiding that the vane 44 is brought into solid contact with the sliding surface of each of the side plates 39, 39 to become worn.

In addition, the water is retained in each of the two recesses 44e, 44e defined in each of the opposite surfaces of the vane 44 and hence, each of the recesses 44e, 44e serves as a pressure dam to suppress a drop in pressure due to the leakage of the water. As a result, the vane 44 clamped between the sliding surfaces of the pair of side plates 39, 39 is brought into the floated state by means of the water, whereby the sliding resistance can be decreased to near zero. When the vane 44 is moved reciprocally, the radial position of the vane 44 relative to the rotor 27 is changed, but the vane 44 moved reciprocally can be always retained in the floated state to effectively reduce the sliding resistance, because the recesses 44e, 44e are provided in the vane 44 rather than in the side plates 39, 39 and provided in the vicinity of the rollers 45, 45 with the load applied most largely to the vane, 44.

The water which has lubricated the sliding surfaces of the vane on the side plates 39, 39 is moved radially outwards by the centrifugal force to lubricate the sliding portions of the seal member 46 mounted on the arcuate face 44b of the vane 44 and the arcuate face 14b of the rotor chamber 14. The water which has finished the lubrication is discharged from the rotor chamber 14 through the exhaust ports 80 into the exhaust chamber 20.

Portions of the water flowing into the rotor chamber 14 after lubricating the sliding surfaces of the side plate 39, 39 and the vane 44, which flow into the vane chambers 50 in an expansion stroke in the rotor chamber 14, are mixed with the high-temperature vapor and evaporated, thereby increasing the output from the expander 4.

Figure 13:
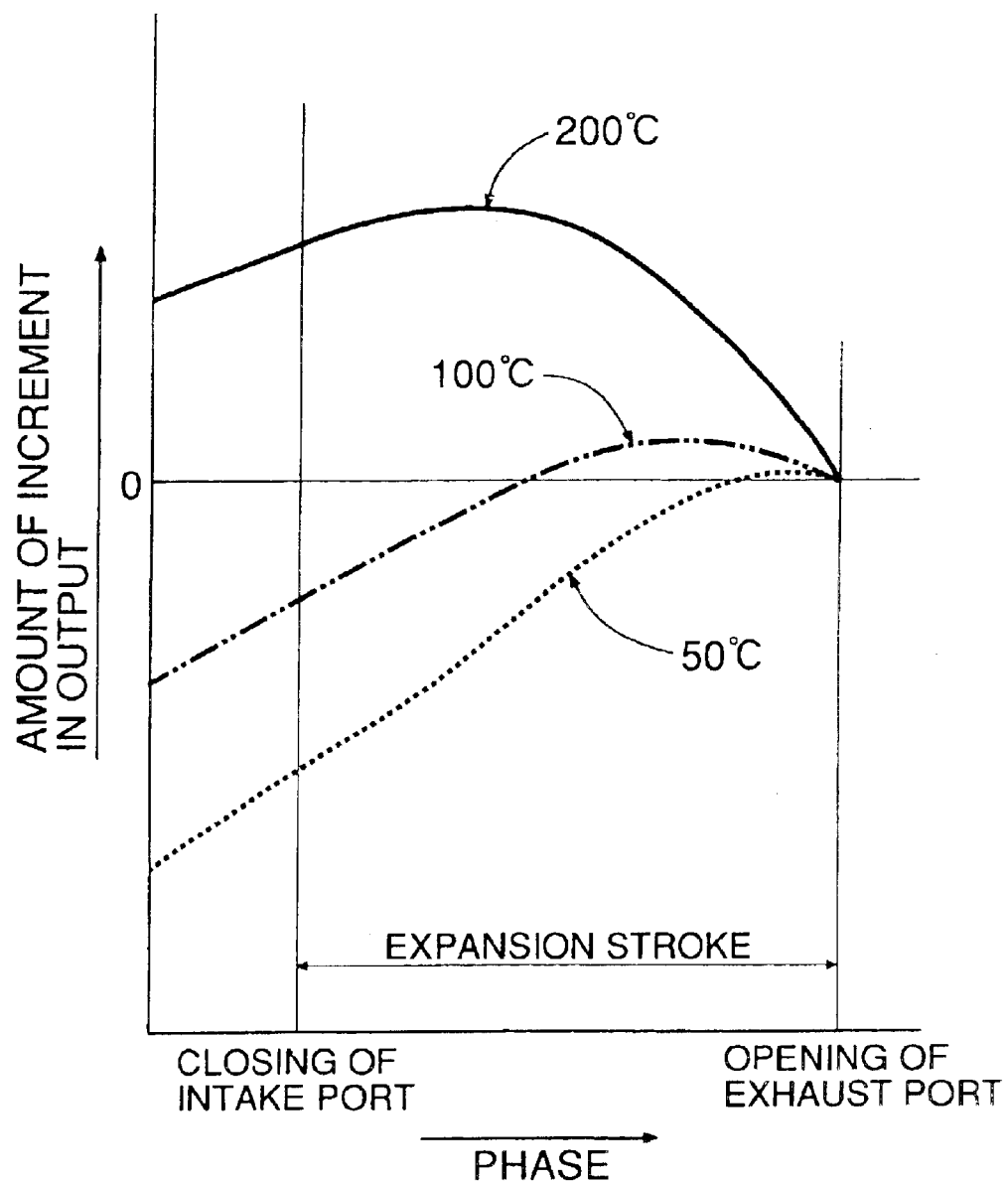

The axis of abscissas in a graph shown in FIG. 13 is the timing (phase) for supplying the eater to the vane chamber 50, and the axis of ordinates is the amount of increment in output from the expander 4. In addition, the pressure of water supplied to the vane chamber 50 through the sliding surfaces is 2 MPa, and the percent of the amount of water supplied to the vane chamber 50 through the sliding surfaces, to the amount of water supplied from the evaporator 3 via the passage P4 to the vane chamber 50 in the expander 4, is 60%. Shown in FIG. 13 are curves in cases where the temperature of the water supplied to the vane chamber 50 through the sliding surfaces is 50° C., 100° C. and 200° C. It can be seen from FIG. 13 that as the higher the temperature of the water, the more the amount of the output from the expander 4 is increased, and the more the phase, in which the mount of increment in output assumes a peak, is fastened.

Figure 14:
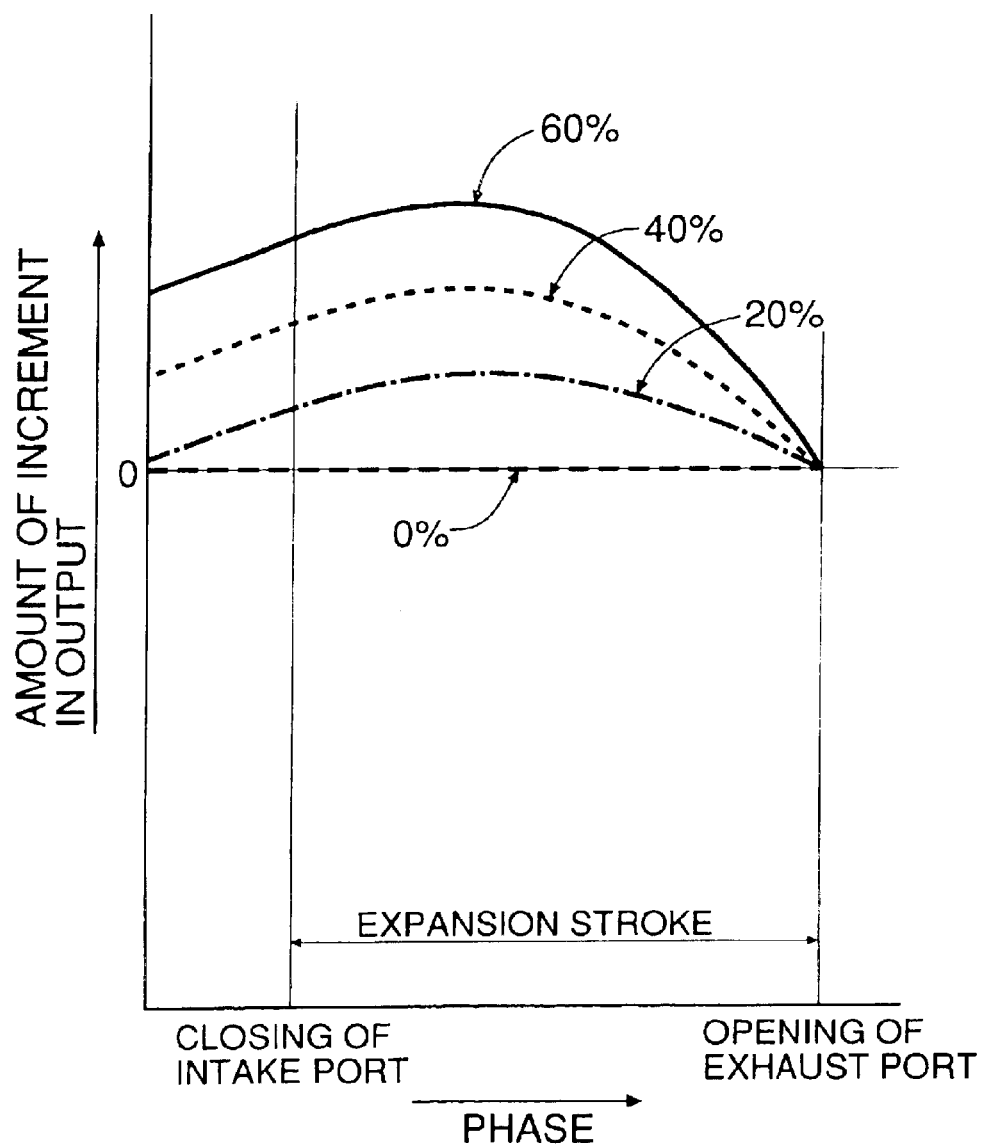

The axes of abscissas and ordinates in a graph shown in FIG. 14 are the same as in FIG. 13. Shown in Fiug.14 are curves in cases where the percent of the amount of water supplied to the vane chamber 50 through the sliding surfaces, to the amount of water supplied from the evaporator 3 via the passage P4 to the vane chamber 50 in the expander 4, is 0%, 20%. 40% and 60%. In this case, the pressure of the water supplied to the vane chamber 50 through the sliding surfaces is 2 MPa, and the temperature of such water is constant. It can be seen that if the percent of the amount of the water supplied to the vane chamber 50 through the sliding surfaces is increased, the amount of increment in output from the expander 4 is increased, but the phase in which in which the mount of increment in output assumes a peak is always constant without being varied.

As described above, the water is supplied to the pressure chambers 86, 86 in the bottoms of the circular seal grooves 51, 51 in the first casing half 12 and the second casing half 13 to bias the ring seals 54, 54 toward the side of the rotor 27, and the water is ejected from the lubricating water ejection bores 38d and 38e defined within the recesses 38b and 38c in each of the rotor segments 32 to form the static pressure bearing on the sliding surface on the flat faces 14a, 14a of the rotor chamber 14, whereby the flat faces 27a, 27a of the rotor 27 can be sealed by the ring seals 54, 54 which are in the floated state within the circular seal grooves 51, 51. As a result, the vapor in the rotor chamber 14 can be prevented from being leaked through the clearance between the rotor chamber 14 and the rotor 27. At this time, the ring seals 54, 54 and the rotor 27 are isolated from each other by the water films supplied from the lubricating water ejection bores 38d and 38e, so that they cannot be brought into solid contact with each other. In addition, even if the rotor 27 is inclined, the ring seals 54, 54 within the circular seal grooves 51, 51 are inclined, following the inclination of the rotor 27, whereby the stable sealing performance can be ensured, while suppressing the frictional force to the minimum.

The water which has lubricated the sliding portions of the ring seals 54, 54 and the rotor 27 is supplied to the rotor chamber 14 by the centrifugal force and discharged therefrom via the exhaust ports 80 to the outside of the casing 11.

On the other hand, the water supplied from the sixth water passage W6 flows via the orifices defined around the outer peripheries of the orifice-defining bolts 91 in the bearing member 23 and the twelfth water passages 12 to form the water film on sliding surfaces of the inner periphery of the bearing member 23 and the outer periphery of the rotary shaft 21 to support the outer periphery of a right half of the rotary shaft 21 in the floated state by the water film, thereby lubricating the sliding surfaces in such a manner that the solid contact of the rotary shaft 21 and the bearing member 23 with each other is prevented to prevent the occurrences of the seizure and the wearing. The water supplied from the sixth water passage W6 to the seventh water passages W7, the ninth water passages W9, the tenth water passages W10 and the eleventh water passage W11 defined in the rotary shaft 21 flows via the orifices defined around the outer peripheries of the orifice-defining bolts 91 in the bearing member 22 and the twelfth water passages W12 to form the water film on sliding surfaces of the inner periphery of the bearing member 22 and the outer periphery of the rotary shaft 21 to support the outer periphery of a left half of the rotary shaft 21 in the floated state by the water film, thereby lubricating the sliding surfaces in such a manner that the solid contact of the rotary shaft 21 and the bearing member 23 with each other is prevented to prevent the occurrences of the seizure and the wearing. The water which has lubricated the sliding surfaces of the bearing members 22 and 23 is discharged via the thirteenth water passages W13 defined within the bearing members 22 and 23 into the vane grooves 43.

The water accumulated in the vane grooves 43 flows into the water discharge passages 44g connecting the bottoms of the vanes 44 with one-sides of the vanes 44, but because the water discharge passages 44g open into the rotor chamber 14 in a predetermined angle range where the vanes 44 protrude most largely from the rotor 27, the water in the vane grooves 43 is discharged via the water discharge passages 44g into the rotor chamber 14 under the action of a difference in pressure between the vane grooves 43 and the rotor chamber 14.

The water supplied from the sixth water passage W6 via the thirtieth water passage W30 defined in the rotary shaft 21 lubricates the outer periphery of the first fixing shaft 64 and the right half of the sliding surface on the inner periphery of the rotary shaft 21, and is then discharged from the seal groove 64c in the first fixing shaft 64 via the thirty first water passages W31, W31 to the fifth vapor passage S5. Further, the water from the eleventh water passage W11 lubricates the outer periphery of the first fixing shaft 64 and the left half of the sliding surface on the inner periphery of the rotary shaft 21, and is then discharged from the seal groove 64d in the first fixing shaft 64 via the thirty first water passage W31 to the fifth vapor passage S5.

As described above, the rotor 27 of the expander 4 is constituted in a divided manner by the rotor core 31 and the plurality of rotor segments 32 and hence, the dimensional accuracy of the vane grooves 43 in the rotor 27 can be enhanced easily. In the simple rotor 27, it is extremely difficult to make the vane grooves 43 with a groove width having a good accuracy to enhance the surface roughness of the sliding surface, but such problem can be solved by assembling the plurality of previously fabricated rotor segments to the rotor core 31. Moreover, even if an error is accumulated due to the assembling of the plurality of rotor segments 32, the accumulation of error can be absorbed by regulating the size of last one of the rotor segments 32, thereby fabricating the rotor 27 having a high accuracy as a whole.

The inner rotor core 31 to which the high-temperature and high-pressure vapor is supplied and each of the outer rotor segments 32 relatively low in temperature are formed by the different members. Therefore, the transmission of heat from the rotor core 31 having the high temperature to the rotor segments 32 can be suppressed, whereby the dissipation of heat to the outside of the rotor 27 can be prevented to enhance the thermal efficiency, but also the thermal deformation of the rotor 27 can be moderated to enhance the accuracy. Moreover, a material and a processing method suitable for each of the functions of the rotor core 31 and the rotor segments 32 can be selected and hence, the degree of freedom of the design and the degree of freedom of the processing method are increased, and the alleviation of the wearing of the sliding surfaces of the rotor segments 32 and the vanes 44, an enhancement in durability and an enhancement in sealability can be achieved. Further, even when a disadvantage is arisen in a portion of the rotor 27, the rotor 27 can be repaired only by replacing such portion by a new portion. This can contribute to a reduction in cost, as compared with a case where the entire rotor is replaced by a new rotor, or is discarded.

The operation of a cooling system for the internal combustion engine 1, including the Rankine cycle system 2, will be described below mainly with reference to FIGS. 1 and 2.

The water pumped from the tank 6 by the lower-pressure pump 7 is supplied via the passage P1 to the heat exchanger 102 mounted in the exhaust pipe 101, where it is preheated. Then, the water is supplied via the passage P2 to the water jacket 105 of the internal combustion engine 1. The water flowing within the water jacket 105 cools the cylinder block 103 and the cylinder head 104 which are the heated portions of the internal combustion engine 1, and this water is supplied in a temperature-raised state to the dispensing valve 106. The water preheated in the heat exchanger 102 in the exhaust pipe 101 is supplied to the water jacket 105, as described above, and hence, when the temperature of the internal combustion engine 1 is lower, the warming of the engine 1 can be promoted. In addition, performance of the evaporator 3 can be enhanced by preventing the overcooling of the internal combustion engine 1 to raise the temperature of the exhaust gas.

A portion of the higher-temperature water dispensed by the dispensing valve 106 is pressurized by the higher-pressure pump 8 and supplied to the evaporator 3, where it is subjected to the heat exchange with the exhaust gas and thus converted into a higher-temperature and higher-pressure vapor. The higher-temperature and higher-pressure vapor generated in the evaporator 3 is supplied to the vapor supply pipe 75 for the expander 4; passed through the cylinders 33 and the vane chambers 50 to drive the rotary shaft 21 and then discharged from the discharge bore 17b.

Another portion of the higher-temperature water dispensed by the dispensing valve 106 is depressurized by the reducing valve 107 incorporated in the passage P5 and thus converted into a vapor, which is supplied to the relay chamber 19 in the expander 4. The vapor supplied to the relay chamber 19 is joined with the first dropped-temperature and dropped-pressure vapor supplied from the vapor supply pipe 75 and passed through the cylinders 33, and the resulting mixture drives the rotary shaft 21 and is then discharged from the discharge bore 17b. As described above, a portion of the higher-temperature water from the dispensing valve 106 is vaporized by the reducing valve 107 and supplied to the expander 4 and hence, the heat energy received in the water jacket 105 of the internal combustion engine 1 by the water can be utilized effectively to increase the output from the expander 4. In addition, the other portion of the higher-temperature water dispensed by the dispensing valve 106 is supplied via the passage P6 to the first water passage W1 in the expander 4 to lubricate various portions to be lubricated. Because the portions to be lubricated of the expander 4 are lubricated using the higher-temperature water, as described above, the expander 4 can be prevented from being overcooled, thereby reducing the cooling loss. The water entering the vane chambers 50 in the expansion stroke after the lubrication is mixed with the vapor existing in the vane chamber 50, whereby it is heated and vaporized to increase the output from the expander 4 by the action of its expansion. The second dropped-temperature and dropped-pressure vapor discharged from the discharge bore 17b in the expander 4 to the passage P8 is supplied to the condenser 5, where it is cooled by the cooling fan 19 to become water and returned to the tank 6. The other portion of the higher-temperature water dispensed by the dispensing valve 106 is cooled by the heat exchange with the auxiliary 110 incorporated in the passage P7 and then returned via the check valve 111 to the tank 6.

As described above, the following water-circulating paths are combined with each other: a water-circulating path through which the water pumped from the tank 6 by the lower-pressure pump 7 is supplied to the water jacket 105 to cool the heat d portions of the internal combustion engine and thereafter, the water is supplied the water to the auxiliary 110 to cool it and then returned to the tank 6; and a water-circulating path in the Rankine cycle system 2, through which a portion of the water exiting from the water jacket 105 is dispensed as the working medium and returned via the higher-pressure pump 8, the evaporator 3, the expander 4 and the condenser 5 to the tank 6. The water-circulating path in the cooling system for the internal combustion engine 1 is of a lower-pressure and a larger flow rate, and the water-circulating path in the Rankine cycle system 2 is of a higher-pressure and a smaller flow rate. Therefore, the water having a flow rate and a pressure suitable for each of the cooling system for the internal combustion engine 1 and the Rankine cycle system 2 can be supplied, the heated portions of the internal combustion engine 1 can be cooled sufficiently to disuse a radiator, while maintaining the performance of the Rankine cycle system 2. Moreover, the water supplied from the lower-pressure pump 7 to the water jacket 105 is preheated by the heat exchanger 102 mounted in the exhaust pipe 101 and hence, the waste heat from the internal combustion engine 1 can be utilized further effectively.

In addition, the heat exchanger 102 for receiving the lower-temperature water supplied from the lower-pressure pump 7 is mounted at the location downstream of the exhaust pipe 101 where the temperature of the exhaust gas is lower than that at the location of the evaporator 3 and hence, the surplus waste heat possessed by the exhaust gas can be recovered effectively and thoroughly. Further, because the water preheated by the heat exchanger 102 is supplied to the water jacket 105, the overcooling of the internal combustion engine 1 can be prevented, and the temperature of the combustion heat, namely, the exhaust gas can be raised, whereby the heat energy of the exhaust gas can be increased, leading to an enhancement in waste heat recovery efficiency.

Although the embodiment of the present invention has been described in detail, it will be understood that various modifications in design may be made without departing from the subject matter of the present invention.

For example, the water (vapor) is illustrated as the working medium in the embodiment, but according to the present invention, any other working medium such as ammonia and the like can be employed. However, the water is suitable as a lubricating medium also serving as a working medium, because of a wider range of temperature in which the water can be used without variation in composition such as carbonization, and the higher-temperature vapor as the working medium supplied to the expander 4 and the water as the relatively low-temperature lubricating medium discharged from the water jacket 105 of the internal combustion engine 1 can be mixed with each other without hindrance.

INDUSTRIAL APPLICABILITY

The Rankine cycle system for the internal combustion engine according to the present invention is suitable for an automobile, but can be applied to any internal combustion engine other than the automobile.

What is claimed is:

1. A Rankine cycle system for an internal combustion engine, including an evaporator (3) for heating a liquid-phase working medium by a waste heat from an internal combustion engine (1) to generate a gas-phase working medium, an expander (4) for converting a heat energy of the gas-phase working medium discharged from said evaporator (3) into a mechanical energy, a condenser (5) for cooling the gas-phase working medium discharged from said expander (4) to restore the gas-phase working medium into the liquid-phase working medium, a tank (6) for storage of the liquid-phase working medium discharged from said condenser (5), and pumps (7, 8) for supplying the liquid-phase working medium in said tank (6) to said evaporator (3), characterized in that said pumps (7, 8) area lower-pressure pump (7) and a higher-pressure pump (8), said lower-pressure pump (7) having the liquid-phase working medium in said tank (6) pass through a cooling means (105) for the internal combustion engine (1), thereby heating and supplying the liquid-phase working medium to a dispensing valve (106), a portion of the liquid-phase working medium dispensed by said dispensing valve (106) being pressurized by said higher-pressure pump (8) and supplied to said evaporator (3), another portion of the liquid-phase working medium dispensed by said dispensing valve (106) being discharged to said tank (6) after characterized in that said pumps (7, 8) are a lower-pressure pump (7) and a higher-pressure pump (8), said lower-pressure pump (7) having the liquid-phase working medium in said tank (6) pass through a cooling means (105) for the internal combustion engine (1), thereby heating and supplying the liquid-phase working medium to a dispensing valve (106), a portion of the liquid-phase working medium dispensed by said dispensing valve (106) being pressurized by said higher-pressure pump (8) and supplied to said evaporator (3), another portion of the liquid-phase working medium dispensed by said dispensing valve (106) being discharged to said tank (6) after characterized in that said pumps (7, 8) are a lower-pressure pump (7) and a higher-pressure pump (8), said lower-pressure pump (7) having the liquid-phase working medium in said tank (6) pass through a cooling means (105) for the internal combustion engine (1), thereby beating and supplying the liquid-phase working medium to a dispensing valve (106), a portion of the liquid-phase working medium dispensed by said dispensing valve (106) being pressurized by said higher-pressure pump (8) and supplied to said evaporator (3), another portion of the liquid-phase working medium dispensed by said dispensing valve (106) being discharged to said tank (6) after dissipating its heat in an auxiliary (110).

2. A Rankine cycle system for an internal combustion engine according to claim 1, wherein water is used as the liquid-phase working medium.

3. A Rankine cycle system for an internal combustion engine according to claim 1, wherein a portion of the heated liquid-phase working medium dispensed from said dispensing valve (106) is used as a lubricating medium for said expander (4).

4. A Rankine cycle system for an internal combustion engine according to claim 3, wherein the portion of the liquid-phase working medium supplied as the lubricating medium is supplied to an expansion stroke of said expander (4).

5. A Rankine cycle system for an internal combustion engine according to claim 1, wherein the liquid-phase working medium exiting from said lower-pressure pump (7) is preheated in a heat exchanger (102) mounted in an exhaust pipe (101) in the internal combustion engine (1) and supplied to said cooling means (105).

6. A Rankine cycle system for an internal combustion engine according to claim 5, wherein a portion of the heated liquid-phase working medium dispensed from said dispensing valve (106) is passed through a reducing valve (107) to be converted into a gas-phase working medium, which is supplied to an expansion stroke of the expander (4).

* * * * *